(12) United States Patent
Lawrence

(10) Patent No.: US 9,026,750 B2
(45) Date of Patent: *May 5, 2015

(54) SYSTEMS AND METHODS FOR MANAGING DATA IN A COMPUTING ENVIRONMENT

(71) Applicant: Andy Vincent Lawrence, Alpine, UT (US)

(72) Inventor: Andy Vincent Lawrence, Alpine, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/574,173

(22) Filed: Dec. 17, 2014

(65) Prior Publication Data

US 2015/0095549 A1 Apr. 2, 2015

Related U.S. Application Data

(63) Continuation of application No. 13/371,371, filed on Feb. 10, 2012.

(60) Provisional application No. 61/442,221, filed on Feb. 12, 2011.

(51) Int. Cl.
| | | |
|---|---|---|
| *G06F 13/00* | (2006.01) | |
| *G06F 13/28* | (2006.01) | |
| *G06F 17/30* | (2006.01) | |
| *G06F 12/02* | (2006.01) | |

(52) U.S. Cl.
CPC ...... *G06F 17/30188* (2013.01); *G06F 12/0238* (2013.01)

(58) Field of Classification Search
None
See application file for complete search history.

(56) References Cited

U.S. PATENT DOCUMENTS

| | | |
|---|---|---|
| 5,692,129 A | 11/1997 | Sonderegger et al. |
| 5,859,978 A | 1/1999 | Sonderegger et al. |
| 6,253,300 B1 | 6/2001 | Lawrence et al. |
| 6,615,365 B1 | 9/2003 | Jenevein et al. |
| 7,661,036 B1 | 2/2010 | Clingenpeel et al. |
| 2007/0083568 A1* | 4/2007 | McGovern et al. ............ 707/200 |
| 2007/0283114 A1 | 12/2007 | Lawrence |
| 2008/0140969 A1 | 6/2008 | Lawrence |
| 2012/0210083 A1 | 8/2012 | Lawrence |

* cited by examiner

*Primary Examiner* — Eric S Cardwell

(57) ABSTRACT

Improved data management systems for managing and maintaining unstructured data in a computing system environment. Data content is associated with particular types of metadata to create data objects. In certain examples, the metadata is stored in various fields of the data objects, certain fields being designated as permanently read-only after their creation. Such fields can include, for instance, a unique identifier, a type of content and a classification governing copy permissions relating to the data object. Data objects, or didgets, can be grouped into logical containers referred to as chambers, which are further grouped by common control elements or attributes into domains. Chambers within a particular domain can generally freely share information therebetween, including copies of various types of didgets. A control program, or didget manager, in each domain manages the creation of didgets and subsequent operations directed thereto.

20 Claims, 15 Drawing Sheets

| | Marker ID | Marker Type | Creation DateTime | EventCounter Value | Time Delta |
|---|---|---|---|---|---|
| | 20A3-347E-2C2C-1E53 | Chamber Created | Wed Feb 01 09:40:26 2012 | 1 | - 2 Days 03:29:22 |
| | 0A64-4023-2B46-0A3F | Chamber Dismounted | Wed Feb 01 09:55:28 2012 | 23777 | - 2 Days 03:14:20 |
| | 1FA4-255C-2667-45A2 | Chamber Mounted | Wed Feb 01 09:55:39 2012 | 23778 | - 2 Days 03:14:09 |
| | 252A-645A-4947-07D9 | Chamber Dismounted | Wed Feb 01 09:56:42 2012 | 23785 | - 2 Days 03:13:06 |
| | 2119-57C2-398A-2153 | Chamber Mounted | Wed Feb 01 09:57:33 2012 | 23786 | - 2 Days 03:12:15 |
| | 1F3A-5257-4462-4437 | Chamber Dismounted | Wed Feb 01 10:12:08 2012 | 49248 | - 2 Days 02:57:40 |
| | 0D32-513B-02A3-760F | Chamber Mounted | Wed Feb 01 10:55:10 2012 | 49249 | - 2 Days 02:14:38 |
| | 0D41-662B-1C3F-3BBB | Chamber Dismounted | Wed Feb 01 10:56:55 2012 | 49252 | - 2 Days 02:12:53 |
| | 2621-56CA-2A50-0CAC | Chamber Mounted | Wed Feb 01 21:13:05 2012 | 49253 | - 1 Days 15:56:43 |
| | 2295-63AE-3363-45B8 | Chamber Dismounted | Wed Feb 01 22:21:09 2012 | 49270 | - 1 Days 14:48:39 |
| | 1D35-13E3-452B-0A4E | Chamber Mounted | Fri Feb 03 07:51:55 2012 | 49271 | - 0 Days 05:17:53 |
| | 2521-765F-3C2E-221A | Chamber Dismounted | Fri Feb 03 07:52:01 2012 | 49272 | - 0 Days 05:17:47 |
| | 3A9C-1D87-147E-6220 | Chamber Mounted | Fri Feb 03 08:30:19 2012 | 49273 | - 0 Days 04:39:29 |
| | 2C97-1248-3465-2D31 | Chamber Dismounted | Fri Feb 03 08:30:26 2012 | 49274 | - 0 Days 04:39:22 |
| | 3F82-A823-40C0-6119 | Chamber Mounted | Fri Feb 03 08:36:44 2012 | 49275 | - 0 Days 04:33:04 |
| | 1C74-1460-7113-0648 | Chamber Dismounted | Fri Feb 03 08:42:36 2012 | 49276 | - 0 Days 04:27:12 |
| | 04GD-7324-4B1D-1824 | Chamber Mounted | Fri Feb 03 08:42:40 2012 | 49277 | - 0 Days 04:27:08 |
| | 2429-68FC-5983-1F8A | Chamber Dismounted | Fri Feb 03 09:09:31 2012 | 49278 | - 0 Days 03:11:17 |
| | 1085-5622-1181-132C | Chamber Mounted | Fri Feb 03 13:09:48 2012 | 49279 | |
| | 3C10-0645-288D-7A6E | Chamber Dismounted | Fri Feb 03 13:10:56 2012 | 49388 | + 0 Days 00:01:08 |
| | 22ED-234E-0D82-0A9B | Chamber Mounted | Fri Feb 03 21:55:35 2012 | 49389 | + 0 Days 08:45:47 |
| | 19DB-3A19-6D27-3576 | Chamber Dismounted | Fri Feb 03 22:05:57 2012 | 49410 | + 0 Days 08:56:09 |
| | 2AEC-7A81-7736-42ED | Chamber Mounted | Fri Feb 03 22:06:02 2012 | 49411 | + 0 Days 08:56:14 |
| | 2DA3-7412-4326-7BF5 | Chamber Dismounted | Fri Feb 03 22:13:50 2012 | 49434 | + 0 Days 09:04:02 |
| | 3357-393D-5F47-1928 | Chamber Mounted | Fri Feb 03 22:17:02 2012 | 49435 | + 0 Days 09:07:14 |
| | 1F69-3DFF-72D9-92AF | Chamber Dismounted | Fri Feb 03 22:19:40 2012 | 49438 | + 0 Days 09:09:52 |
| | 05F1-1A9E-7C6E-5769 | Chamber Mounted | Sun Feb 05 20:40:47 2012 | 49439 | + 2 Days 07:30:59 |

Total markers found: 29

SYSTEMS AND METHODS FOR MANAGING DATA IN A COMPUTING ENVIRONMENT

RELATED APPLICATIONS

This application is a continuation of and claims priority benefit under 35 U.S.C. §120 from U.S. patent application Ser. No. 13/371,371, filed Feb. 10, 2012, and entitled "SYSTEMS AND METHODS FOR MANAGING UNSTRUCTURED DATA," which claims the benefit of priority under 35 U.S.C. §119(e) from U.S. Provisional Application No. 61/442,221, filed Feb. 12, 2011, and entitled "SYSTEMS AND METHODS FOR MANAGING STREAM OBJECTS," the entirety of each of which is hereby incorporated herein by reference to be considered part of this specification.

BACKGROUND

1. Field

The present disclosure relates to data management and, in particular, to systems and methods for managing and controlling data stored on non-volatile, block-oriented data storage devices.

2. Description of the Related Art

With the increasing reliance and importance of electronic data, data management systems are playing a more critical role in the everyday lives of individuals and businesses. For instance, one individual may store data on several different devices, such as a smartphone, a hard disk, a flash drive and a media device. Moreover, each year, the capacity of these storage devices seems to increase significantly, as well as does the access speed, albeit at a slower rate. With this comes the challenge of effectively and efficiently managing large amounts of unstructured data across multiple platforms.

In the case of many conventional computer devices, unstructured data is stored, manipulated and managed through a file system that organizes data files in a hierarchical structure and maintains information on the locations of the various files. In such computer systems, generally all data operations are initiated by software applications running on a host computing device. One drawback that exists, however, is that file systems are not generally designed to perform file maintenance operations or other operations (e.g., read and write operations) on stored data in the absence of express instructions from software applications executing on the host computing device. For example, if a user wants a newly created document to be backed up to remote storage, an application must be executed that is capable of reading in the new document and copying it to a location on the remote storage. The file system does not perform a task such as this independently.

Each file system is also volume specific and controls and/or knows about files only within its associated volume. Thus, different file system volumes generally remain independent of each other, even if they are mounted by the same host computer's operating system. As an example, in order to copy a file from one volume to another, an application must read in the file from the source volume and write a copy of that file out to the destination volume. The file system does not maintain any links or references to other volumes or files in the computer system.

In addition to the above, in conventional computer systems, any application with the proper security access can create a file of any type in any folder within a storage volume as long as there is sufficient space to store the file. With proper permissions, an application can also delete or modify the contents of any existing file, even bypassing safeguards inherently provided by the operating system and/or file system. For instance, an application can move a file by renaming a portion of its identifier (e.g., pathname in the case of files) to reflect that the file belongs in a different folder. The application can also make copies of any file within the computer system without restraint at any given time.

SUMMARY

In view of the foregoing, a need exists for improved systems and methods for intelligently managing unstructured data within a computing environment. For instance, there is a need for systems and methods for maintaining data and performing maintenance operations on such data without the limitations inherent in file system environments, some of which are outlined above. Moreover, a need exists for data management structures and organization that are application-agnostic and offer improved data protection and data management capabilities over existing data storage infrastructures or block storage systems, including across heterogeneous storage devices.

Certain embodiments of the invention advantageously provide a data management system that is configured to perform general data maintenance operations that execute independently of applications and/or that accelerate grouping, searching and categorizing of unstructured data stored in the system. For example, a data management system can be configured to include a plurality of data elements, stream objects or data objects, collectively referred to herein as didgets, that maintain a data stream and select metadata regarding that stream. The didgets can be self-describing and are organized into containers, referred to as chambers, which are further grouped by common control elements or attributes into domains and, as a whole, constitute a single, global didget realm. The attributes and/or policies associated with the domain govern how the chambers within that domain may exchange and access didgets.

In certain embodiments of the invention, an instance of a control program, sometimes referred to as a didget manager instance, replaces functions of the file system. The didget manager can be configured to copy, create, delete or otherwise manage didgets and can further enforce how didgets are created, copied, accessed, altered, and/or deleted within any given chamber. For example, the didget manager can provide an interface between the data within a given storage system and applications (such as via one or more application program interfaces (APIs), file systems, or operating systems operating on one or more host devices that may want to create new data or modify existing data within that storage system.

In certain embodiments of the invention, a system is described for managing unstructured data. The system comprises a control module executing on a computing device and a plurality of data chambers each containing at least one data object stored on one or more physical storage devices. Each data object further comprises a data stream and a plurality of metadata fields having metadata associated with the data stream. The metadata fields for each data object comprise: (i) a first write-once-read-many (WORM) metadata field configured to store a unique identification for the data object; (ii) a second WORM metadata field configured to store a data object class defining copy permissions of the data object within the data chambers; and (iii) a third WORM metadata field configured to store a data object type corresponding to contents of the data stream. The control module is further configured to manage access to each data object and to govern the copying of any data object from a first data chamber to a second data chamber based its data object class.

In certain embodiments, a method is disclosed for managing unstructured data stored on one or more physical storage media. The method includes receiving with a control module executing on a computing device a plurality of data streams of content and assigning read-only metadata for each of the data streams. The act of assigning further comprises generating for each data stream: (i) a unique data object identification; (ii) a data object class defining copy permissions associated with the data stream; and (iii) a data object type corresponding to a nature of the content of the data stream. The method also includes storing the read-only metadata with the data streams on a physical storage device to create a plurality of data elements.

In certain embodiments, a data structure is disclosed for managing unstructured data stored on physical storage media. The data structure comprises a data stream comprising a plurality of data blocks representing content and a plurality of metadata fields associated with the data stream. The metadata fields further comprise: (i) a first field configured to store a unique identification; (ii) a second field configured to store a data object class defining copy permissions of the data stream within a plurality of data containers; and (iii) a third field configured to store a type corresponding to the content represented by the plurality of data blocks. In certain further embodiments, each of the first field, the second field and the third field comprises a write-once-read-many (WORM) metadata field.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 10A-10D illustrate various screen shots of a user interface for managing didgets within a domain according to certain embodiments of the invention.

DETAILED DESCRIPTION OF THE EMBODIMENTS

Figure 1:
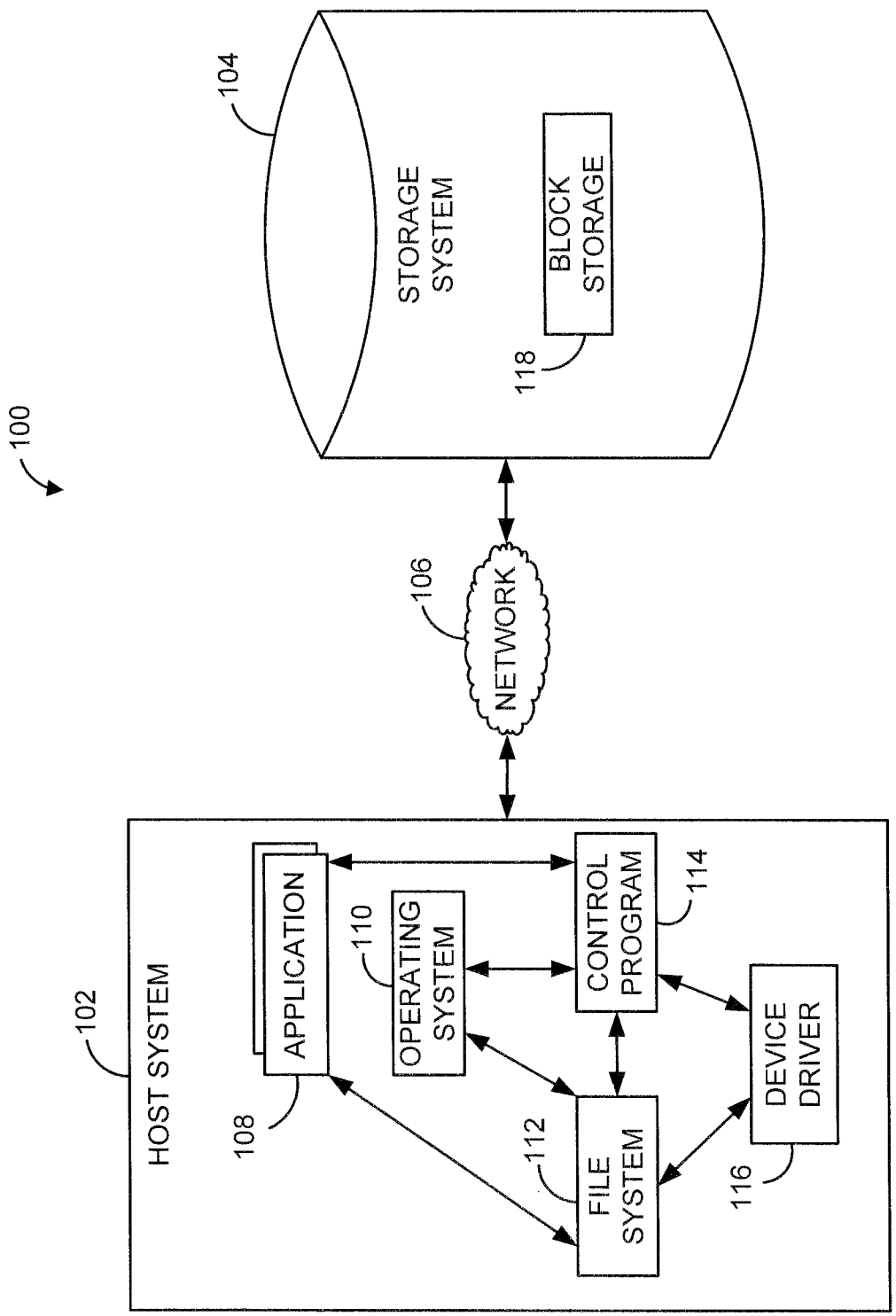
FIG. 1 illustrates a block diagram of a data management system according to certain embodiments of the invention.

As will be seen from the disclosure herein, certain embodiments of systems and methods are provided for intelligent data management. In particular, embodiments of the invention include improved systems and methods for organizing, searching and manipulating unstructured data stored across multiple storage platforms. Moreover, certain embodiments of the data management systems described herein offer alternatives to, and/or replacements for, conventional block storage techniques, file system volumes, and file structures.

Certain embodiments of the invention advantageously provide a data management system that is configured to perform general data maintenance operations that execute independently of applications. For example, a data management system can be configured to include a plurality of data elements called didgets that maintain a data stream and accompanying metadata regarding that stream. Didgets can be organized into containers, or chambers, which are further grouped into domains based on common control elements and/or attributes. Attributes and/or policies associated with the domain govern how the didgets within the chambers in the domain can be shared and/or accessed.

In certain embodiments of the invention, a control program, or didget manager, manages how the didgets can be created, copied, accessed, altered, and/or deleted within any given chamber. For example, the didget manager can create, delete and/or modify didgets on its own accord or via instructions from application(s) through one or more APIs.

In certain embodiments of the invention, a system is described for managing unstructured data. The system comprises a control module executing on a computing device and a plurality of data chambers each containing at least one data object stored on one or more physical storage devices. Each data object further comprises a data stream and a plurality of metadata fields having metadata associated with the data stream. The metadata fields for each data object comprise: (i) a first write-once-read-many (WORM) metadata field configured to store a unique identification for the data object; (ii) a second WORM metadata field configured to store a data object class defining copy permissions of the data object within the data chambers; and (iii) a third WORM metadata field configured to store a data object type corresponding to contents of the data stream. The control module is further configured to manage access to each data object and to govern the copying of any data object from a first data chamber to a second data chamber based its data object class.

In certain embodiments, a method is disclosed for managing unstructured data stored on one or more physical storage media. The method includes receiving with a control module executing on a computing device a plurality of data streams of content and assigning read-only metadata for each of the data streams. The act of assigning further comprises generating for each data stream: (i) a unique data object identification; (ii) a data object class defining copy permissions associated with the data stream; and (iii) a data object type corresponding to a nature of the content of the data stream. The method also includes storing the read-only metadata with the data streams on a physical storage device to create a plurality of data elements.

In certain embodiments, a data structure is disclosed for managing unstructured data stored on physical storage media. The data structure comprises a data stream comprising a plurality of data blocks representing content and a plurality of metadata fields associated with the data stream. The metadata fields further comprise: (i) a first field configured to store a unique identification; (ii) a second field configured to store a data object class defining copy permissions of the data stream within a plurality of data containers; and (iii) a third field configured to store a type corresponding to the content represented by the plurality of data blocks. In certain further embodiments, each of the first field, the second field and the third field comprises a write-once-read-many (WORM) metadata field.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

The following description further provides specific details for a thorough understanding of, and enabling description for, these embodiments of the invention. However, one skilled in the art will understand that the embodiments of the invention may be practiced without these details. In other instances, well-known structures and functions have not been shown or described in detail to avoid unnecessarily obscuring the description of the embodiments of the invention.

Unless described otherwise below, aspects of the invention may be practiced with various data processing systems. Thus, the construction and operation of the various blocks shown in the drawings need not be described in further detail with reference to each drawing to make and use the inventions, because such blocks will be understood by those skilled in the relevant art. One skilled in the relevant art can readily make any modifications necessary to the blocks in the figures based on the detailed description provided herein.

Moreover, embodiments of the invention may be described in the general context of computer-executable instructions, such as routines executed by a general-purpose computer (such as a server computer, wireless device or personal computer). Those skilled in the relevant art will appreciate that certain embodiments of the invention can be practiced with other communications, data processing, or computer system configurations, including: Internet appliances, hand-held devices (including personal digital assistants (PDAs)), wearable computers, mobile phones, multi-processor systems, microprocessor-based or programmable consumer electronics, set-top boxes, network PCs, mini-computers, mainframe computers, smart televisions, cameras, media players, and the like. Indeed, the terms "computer," "host," and "host computer" are generally used interchangeably herein, and refer to any of the above devices and systems, as well as any data processor.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this disclosure.

FIG. 1 illustrates a block diagram of a data management system 100 for managing unstructured data according to certain embodiments of the invention. As shown, the data management system 100 comprises at least one host system 102 capable of communicating with a storage system 104 by sending and/or receiving data over a network 106. For instance, in certain embodiments, the storage system 104 receives and/or stores block data from various types of host systems.

The illustrated storage system 104 may include any type of media capable of storing data. For example, the storage system 104 can be magnetic-based such as hard disk drives or tape drives; flash-memory-based such as USB thumb drives, solid state drives (SSDs) or flash cards; remote storage such as cloud storage; and/or optical-based such as CDs, DVDs or BLU-RAY disks. In certain embodiments, the storage system 104 can present an array of fixed-sized blocks to the attached host system 102. In certain further embodiments, the storage system 104 may be internal and/or external to (e.g., remote to) the host system 102.

In certain embodiments, the storage system 104 may be further implemented as one or more storage "volumes" that include physical storage disks defining an overall logical arrangement of storage space. For instance, disks within a particular volume may be organized as one or more groups of redundant array of independent (or inexpensive) disks (RAID). In certain embodiments, the storage system 104 may include multiple storage devices of the same or different media.

The illustrated network 106 advantageously comprises any means for communicating data between two or more systems or components. It certain embodiments, the network 106 comprises a computer network. For example, the network 106 may comprise a public network such as the Internet, virtual private network (VPN), token ring or TCP/IP based network, wide area network (WAN), local area network (LAN), an intranet network, point-to-point link, a wireless network, cellular network, wireless data transmission system, satellite network, broadband network, combinations of the same or the like. In embodiments wherein the host system 102 and storage system 104 are part of the same computing device, the network 106 may represent a communications socket or other suitable internal data transfer path or mechanism.

As shown, the host system 102 comprises one or more applications 108 residing on and/or being executed by a computing device. For instance, the application(s) 108 may comprise software applications that interact with a user to process data and may include, for example, database applications, graphics applications, gaming applications, multimedia applications, word processors, spreadsheets, financial applications, management applications, browsers, combinations of the same or the like.

The host system 102 further includes an operating system 110. In certain embodiments, the operating system 110 comprises a set of software instructions for managing hardware resources of the host system 102 and for providing common services for the application(s) 108. In certain embodiments, the operating system 110 is configured to schedule tasks for efficient use of the host system's 102 processor time, mass storage, printing, and other resources. For instance, the operating system 110 may comprise MICROSOFT WINDOWS, ANDROID, iOS, LINUX, MAC OS X or the like.

One or both of the application(s) 108 and the operating system 110 can communicate with a file system 112 and/or a control program 114 to interact with data on the storage system 104. In certain embodiments, the file system 112 can create, manage or otherwise organize files and directories (such as in a hierarchical fashion) on the storage system 104 that are accessible by the host system 102.

For instance, the file system 112 can comprise a name space management portion to track metadata and a stream management portion to keep track of the block allocation of the data stored on the source storage system 104. The file system 112 may include, for example, a local file system, a network file system, a file server, a management program or the like, or may include multiple file systems accessible by the operating system 110. For instance, in embodiments wherein the storage system 104 is associated with multiple volumes, each volume may be associated with its own file system 112.

In certain embodiments, a given storage device of the storage system 104 can be divided into one or more individual sections called partitions, wherein each partition can be formatted to form a file system volume. When the file system volume is mounted within the data management system 100, the file system volume falls under the control of the file system 112 software.

As mentioned above, general file maintenance operations can be carried out by the application(s) 108 through the file system 112. For instance, backup, replication, synchronization, virus scans and indexing operations can be performed by application software running external to the file system 112. In such cases, the file system 112 simply performs basic file read and write operations that enable the application(s) 108 to accomplish those file maintenance tasks. For instance, the file system 112 often will not independently initiate operations on file contents other than generic data compression or encryption and will not create, move, copy or delete files except when explicitly instructed to do so by the application 108 or the operating system 110. Even more, the conventional file system 112 is generally data-agnostic and does not distinguish between files containing different content, such as those containing music, software or video. For example, the file system 112 will not refuse to copy a photo file into a folder labeled "software" or prevent one of the application(s) 108 from giving a file an extension of ".MP3" when it contains only text.

As illustrated, the file system 112 can access data on the storage system 104 (e.g., block storage 118) through a device driver 116, such as a file system driver. For example, the device driver 116 can comprise at least one software module configured to perform data and/or storage tasks, archiving, migrating and/or recovery of data. In brief, the device driver 116 may be viewed as treating blocks containing files or other data structures residing on the storage system 104 as "black boxes," merely carrying out the instructions of the file system 112. In other embodiments of the invention, the host system 102 can include multiple device drivers 116, such as one for each storage device within the storage system 104.

In preferred embodiments of the invention, the application(s) 108, the operating system 110 and/or the file system 112 can independently communicate with the control program 114 to manage data on the storage system 104. In certain embodiments, the control program 114 comprises one or more software modules executing on the host system 102 that govern access to data on the storage system 104. For example, the control program 114 can provide an interface between the data within the storage system 104 and any of the application(s) 108 or operating system 110 that may want to create new data or modify existing data within the storage system 104 independently of the file system 112. In such embodiments, the control program 114 could sit on top of the device driver 116 within the host system 102. In certain embodiments, the control program 114 can also be application-agnostic. In certain embodiments having both the file system 112 and the control program 114, each can independently access block storage 118 through the device driver 116. In yet other embodiments, the control program could sit on top of the file system 112, thereby providing for all block I/O to go through the file system 112 since every block read or write performed would just be reading or writing a portion of an existing file.

Block storage 118, as described in more detail below, can comprise a plurality of unstructured data objects or elements representing various types of content stored as data blocks. Music, video, text, and software are all examples of content that can be encoded digitally to form digital data. Such data can be generated, copied, and stored in mass quantities within the data management system 100 on a variety of data storage devices.

Although the data management system 100 has been described with respect to particular embodiments, a skilled artisan will recognize from the disclosure herein that the data management system 100 can take on other embodiments. For example, all or part of the control program 114 can be executed on the storage system 104 and/or the host system 102. Moreover, the file system 112 can sit on top of the control program 114, and/or the control program can function in place of the file system 112 such that the host system 102 can operate without the file system 112. In yet other embodiments, the host system 102 can comprise a plurality of heterogeneous systems in communication with the storage system 104.

Figure 2A:
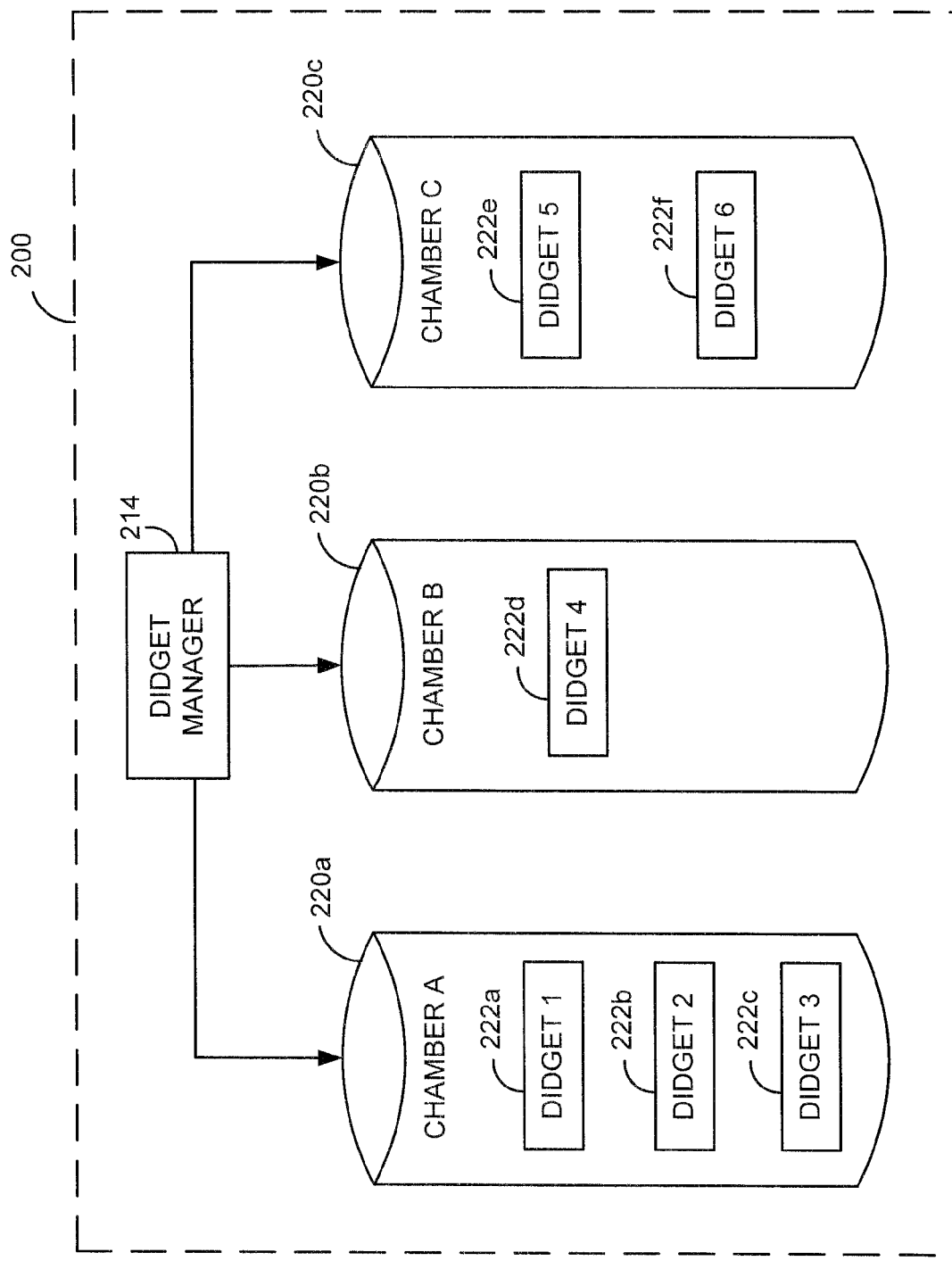
FIG. 2A illustrates a block diagram of a realm that encompasses a general-purpose data management system according to certain embodiments of the invention.

FIG. 2A illustrates a block diagram of an exemplary embodiment of a realm 200 that encompasses a general-purpose data management system. In certain embodiments, the realm 200 comprises a global representation of a plurality of data objects stored over one or more storage devices. For instance, the realm 200 can represent all available data objects within the data management system, a geographic area, or the like.

As shown, the realm 200 comprises a control program, or didget manager 214, that manages a plurality of data objects and controls data operations within the realm 200. For example, the illustrated didget manager 214 communicates with three data containers, or chambers (chamber A 220a, chamber B 220b and chamber C 220c) and manages the data elements contained therein. Each chamber 220a, 220b and 220c represents a logical container and/or virtual pool of one or more data objects or didgets that share a common control element and/or attribute or that are located on the same storage medium. In certain embodiments, each chamber comprises identification information, block allocation information, didget metadata, and didget data streams, as described in more detail with reference to FIG. 4.

The term "didget" as used herein is derived from the phrase "data widget" and is a broad term referring to a data object or element that represents some amount of unstructured data along with controlling metadata that governs access to, description(s) of and/or behavior of, the data. For example, a didget can include, without limitation, data elements, data objects and/or stream objects that comprise general-purpose data (e.g., photographs, documents, and the like), configuration information, policies, security keys, data management information, combinations of the same and the like, along with the corresponding metadata.

Like a conventional file, a didget can have a data stream comprising a sequential set of bytes and a set of metadata for that data, as described in more detail below with respect to FIG. 3. For instance, the content of the data stream could be the same as, or substantially similar to, a corresponding file's contents. Unlike a file, however, a didget is configured to have a much different set of metadata that governs the access to, and behavior of, this data stream.

As discussed in more detail below, in certain embodiments, the metadata record for each didget is advantageously created and/or stored by the didget manager 214 as a small number of bytes, with each metadata record being allocated the same amount of space, such as on the order of less than 200 bytes (e.g., sixty-four bytes). In certain embodiments, the metadata records for didgets may be stored in a table inside a corresponding chamber. Because the number of bytes for each table entry is relatively small, millions of didgets can be listed in the table without requiring a significant number of disk accesses to read it into memory, which provides for, among other advantages, rapid searches of the metadata.

In certain embodiments, each chamber is assigned an identifying number, alphanumeric code or other like value that remains the same throughout the life of the chamber. This chamber identification can be used by the didget manager 214, for example, to track synchronization operations between chambers within the realm 200.

As shown, chamber A 220a further includes didget 1 222a, didget 2 222b and didget 3 222c. Chamber B 220b includes didget 4 222d, and chamber C 220c includes didget 5 222e and didget 6 222f. As will be seen from the disclosure herein, the didgets 222a-f can comprise a variety of content and/or be configured to perform or cause to perform various types of data operations. Similar to a file, a didget can have a data stream that consists of a sequential set of generic bytes along with metadata, which assists the didget manager 214 in properly managing and/or protecting the didget. Moreover, due to the improved data structure of the didget metadata in comparison to general file metadata, the use of didgets provides for a more robust and efficient system for managing data content.

For illustration purposes, the following paragraphs provide non-limiting examples of different types of didgets usable with certain embodiments of the invention.

Data Didgets

In certain embodiments, data didgets contain general data such as a photograph, video content, a software program, combinations of the same or the like. Moreover, data didgets can be further categorized into specific data didget subtypes. Thus, data didgets can be labeled "software didgets," "video didgets," "Windows utility software didgets" and/or "sports video didgets."

Action Didgets

Action didgets can contain information that directs the didget manager 214 to perform basic data management tasks. Action didgets can be further categorized based on their associated actions. For example, action didgets can include "activator didgets," "configuration didgets," "collection didgets," "list didgets," "link didgets," "menu didgets," "security didgets," "policy didgets," "marker didgets" and "reference didgets."

Each type of action didget directs the didget manager 214 to perform a different function. Like a data didget, an action didget can be created by an application, such as one of the application(s) 108. Once created, however, an action didget can cause a behavior to occur within the didget manager 214 even after the application 108 that created the action didget is no longer running.

As an example, application 108 can create a "backup policy didget" that instructs the didget manager 214 to automatically create a backup copy of any newly created "document didgets" to a separate chamber located either on another storage device or over a network on cloud storage. From that point forward, when any document is created by any application 108, the backup policy didget causes the didget manager 214 to create a backup copy of that document whether or not the originating application still exists or is running on the system.

Policy Didgets

As alluded to above, a policy didget can direct the didget manager 214 to perform a specific task against one or more other didgets when a particular event occurs. Examples of policy didget directives can include, for example, "backup a photo didget when it is created"; "replicate a document didget when it is revised"; or "archive a video didget when it is deleted." In certain embodiments, such policies can be created by the user, the didget manger 214 and/or applications 108 executing on the host system 102.

In certain embodiments, policy didgets may be categorized according to the task or action that they cause the didget manager 214 to perform. Such categories may include backup, replication, synchronization, filtering, indexing, activation, referencing, logging, quarantine creation, time marker creation, list generation, security didget generation, policy control, combinations of the same and the like. In yet further embodiments, policy didgets can govern the creation of additional didgets, such as action didgets, by the didget manager 214.

In certain embodiments, the use of policy didgets advantageously enables the didget manager 214 to synchronize data between local storage and remote storage, such as cloud storage. Once the policy didget is created, data later created by applications could then be moved into and out of the cloud without the application(s) needing to be "cloud aware." This process addresses the drawbacks of current cloud architectures that either require individual applications to synchronize their local files with data stored in the cloud by making programming changes to take advantage of "Cloud API" functionality or require the user to specifically take manual action to specify which files to move into the cloud.

Activator Didgets

In certain embodiments, an activator didget represents a key that unlocks another didget for access. For instance, an activator didget can be used for content management of data didgets. In one example, if a data didget is set in its standard metadata to be "metered," the data didget cannot be accessed by an application unless an accompanying activator didget is present in the same chamber. That is, the activator didget must exist and contain the proper credentials in order for the didget manager 214 to grant access to the particular data didget.

Configuration Didgets

A configuration didget contains specific configuration data for an application or a system. This configuration data may include information such as, for example, default settings, installation instructions, available functions, or online locations for help or updates.

For instance, in certain MICROSOFT WINDOWS systems, applications store configuration information in a single database, known as a registry, such that the user can have a single point of access to configure all applications. Unfortunately, this approach also comes with a number of drawbacks. First, because there is a single database that is constantly being changed by applications, corruption to the database could be detrimental to the computer system. Thus, certain procedures must be implemented in such configurations to prevent corruption and/or for the computer system to be able to recover from an occasional corruption event. Second, it is problematic for applications to be able to insert, extract and cleanup entries in this database. The configuration information cannot be easily copied along with the application files, nor can the configuration information be easily deleted from the registry without leaving remnants in the system.

Configuration didgets take a much different approach and each can store configuration information from an application. The configuration didget can be easily edited by an application and/or didget with the appropriate permissions and/or copied to a new chamber along with the corresponding application. However, all the configuration didgets can also be accessed through a single configuration utility (see FIGS. 7A and 7B for more detail). For example, in certain embodiments, the utility presents all the combined configuration data found in many different configuration didgets to the user as if the didgets were all concatenated together. This enables the user to view, edit and/or delete any configuration setting using this utility. Instead of altering a central database, the user's changes would be directed to the corresponding configuration didget without affecting any other didget.

Marker Didgets

In certain embodiments, when any didget is created, modified, or accessed within a chamber, the didget manager 214 stamps its metadata with an event stamp. Unlike in file system environments, however, the didget manager's 214 event stamp can reflect the then-current contents of an incremental counter found within the corresponding chamber rather than the current date and time as reported by the host system's clock.

While this configuration ensures that events within a chamber are recorded in the order in which they occur, the event stamp itself does not provide information as to a specific date and time. That is, while the system would be able to report that a first didget was created exactly one event before a second didget was modified, the system would not be able to report how much time had passed between those two events.

Thus, in certain embodiments, marker didgets correlate a specific event stamp with the host system clock. For instance, when a marker didget is created, the host's date and time are queried and recorded in the didget's standard metadata. Marker didgets can further be categorized according to a corresponding event, such as, for example, "time markers," "chamber mount/dismount markers," "synchronization begin/end markers" or "record begin/end markers."

In certain embodiments, marker didgets can be created by applications at any time. In yet other embodiments, the didget manager 214 can automatically create marker didgets when specific events happen and/or as directed by a policy didget. For example, a policy didget could direct the didget manager 214 to automatically create a time marker didget every fifteen minutes that the system is running. This would insure that events within the system could be tracked in fifteen-minute intervals (or other desired time period).

Marker didgets can be used in a variety of situations. For instance, using marker didgets, an application can perform queries through the didget manager 214 to find out how many events happened or how much time passed between any two markers. For example, an application can request a list of all document didgets that were altered since a chamber was last mounted or a list of all didgets that were created between a marker didget created on Jan. 1, 2011, and another marker didget created on Dec. 31, 2011.

Security Didgets

In certain embodiments, a didget can have optional read and/or write security keys recorded in its standard metadata. For instance, if the didget contains a read security key, no application can access the didget's data stream unless it passes the correct read security key. Likewise, no application can write to the data stream of such didget unless it possesses the correct write security key.

In certain embodiments, the security keys used in the data management systems disclosed herein comprise a thirty-two (32) bit number. In yet other embodiments, other sizes and/or alphanumerical values or other security technology could be used. In yet further embodiments, for additional security, a security key can be divided into pieces and provided to multiple users and/or destinations such that one user never has access to the entire key. For example, in order to access a particular secure didget, a user could be provided with one piece of a key and a particular computer or terminal could be assigned the other piece of the key, thereby requiring the user to access the secure didget by using the particular computer or terminal.

When an application creates the security keys, such as at the creation of the didget, the application must record those key(s) in some location for later access of the didget or for sharing access with other applications. Thus, in certain embodiments of the data management system, the security keys are held by a customized security didget that provides a mechanism for granting access to a single didget or a group of didgets without revealing the actual security keys. The security didget acts somewhat as a proxy for the actual read and/or write security keys for the didgets. Moreover, the security didget can advantageously provide for the sharing of access on a limited basis without granting unrestricted use of the security key(s) to the target application (e.g., a limited lifetime).

In yet further embodiments, in order to protect against brute force attacks to try to discover the security key(s), if the wrong key is passed during an access attempt, the data management system implements a delay of two seconds before returning an access error message.

As described in more detail below with respect to FIG. 8, when an application wants to share access to particular didget(s) with another application, it can: (i) create a security didget; (ii) store all the security keys for the didget(s) at issue in the security didget's data stream; and (iii) provide to the target application access to the security didget. The target application could then access the desired didgets only through the security didget. The target application never sees the actual security keys for the didget(s) it is accessing. Once the security didget is deleted, the target application no longer has access to any of the didgets for which it was previously granted access through the security didget, and the respective security keys are not left out in the open.

Although certain didgets have been described in detail above, it will be recognized from the disclosure herein that a variety of other didgets can be created for use in embodiments of the disclosed data management systems. For example, other types of didgets could include list didgets, menu didgets, collection didgets, link didgets, subtype schema didgets, tag value didgets, tag record didgets, tag schema didgets, reference didgets, combinations of the same and the like.

Figure 2B:
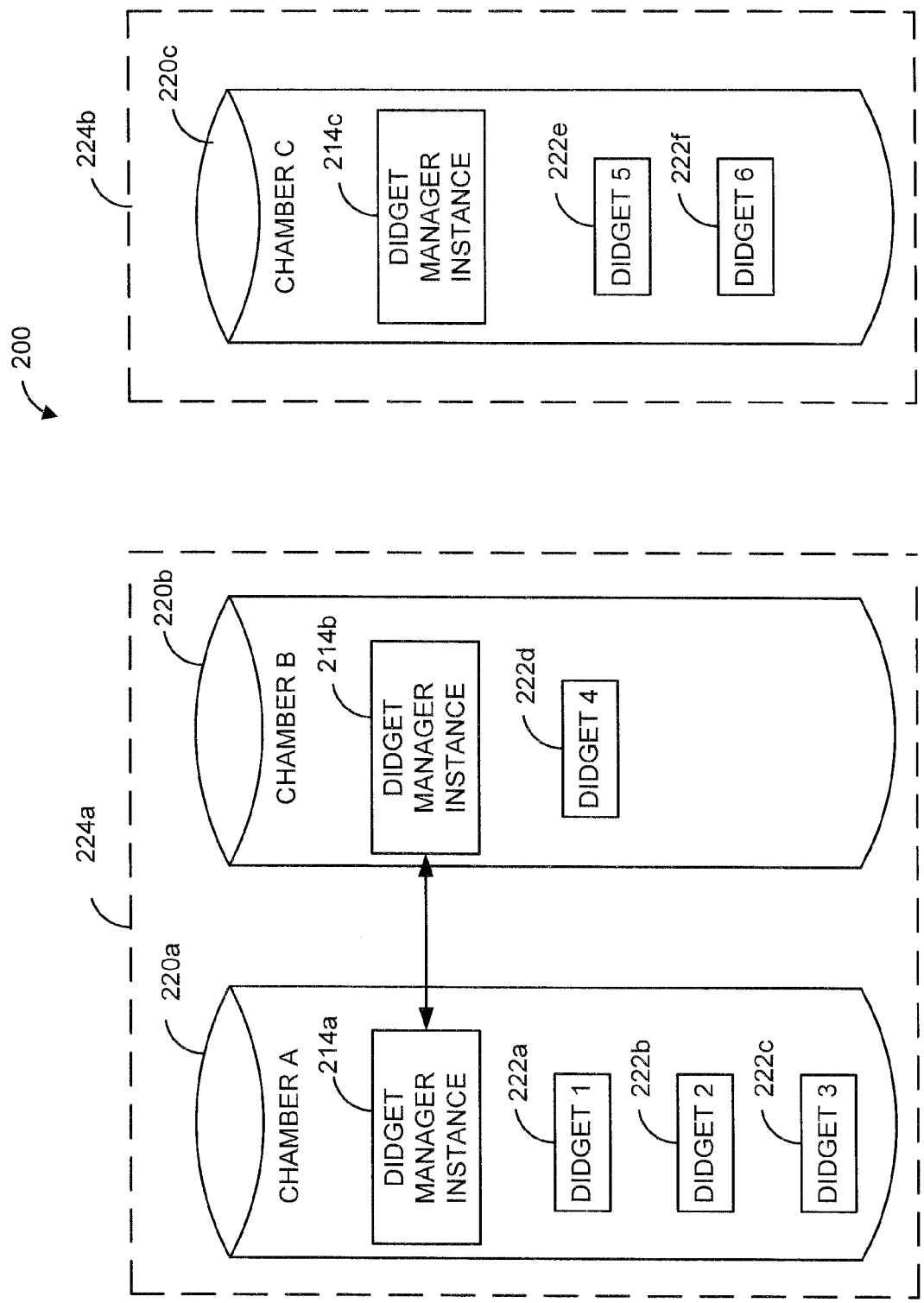
FIG. 2B illustrates a block diagram of another embodiment of the realm comprising a plurality of domains.

FIG. 2B illustrates another embodiment of the realm 200 comprising the plurality of chambers (i.e., chamber A 220a, chamber B 220b and chamber C 220c) including the same didgets described in FIG. 2A. However, FIG. 2B further illustrates chamber A 220a and chamber B 220b as being grouped in a first domain 224a and chamber C 220c being part of a second domain 224b.

Each chamber further includes its own instance of the didget manager 214 for controlling and/or managing didget-related operations therein. In particular, chamber A 220a includes a didget manager instance 214a, chamber B 220b includes a didget manager instance 214b, and chamber C 220c includes a didget manager instance 214c. In certain embodiments, the use of data manager instances is especially important when working across multiple host devices, such that there exists a data manager instance associated with each host device.

In certain embodiments of the invention, the domain represents a logical collection of chambers that share common ownership and/or control attributes. For instance, a domain can be associated with a particular user and/or computer. Moreover, each chamber within a particular domain can contain status information about each of the other chambers within that domain. This status information may include the number of didgets within the chamber, when it was last accessed, updated, or backed up, other usage statistics, combinations of the same and the like. In certain embodiments, the didget manager instances 214 keep this information in the respective chambers up to date, such as in a table or other like record.

In certain embodiments, each chamber is a member of only one domain, and there can exist many different domains within the realm. When a new chamber is created, it either joins an existing domain or it becomes the first chamber in a new domain.

In certain embodiments, chambers within the same domain are able to exchange more data than can chambers that are in different domains. For example, if a user were given permission to access a didget in one chamber, the user would be given this same permission to access any copy of that didget found in any chamber within the same data domain. If a copy of the didget were found in a chamber that was in a different domain, the user permissions would not apply. In one example, such a process would enable a user to purchase permission to access a didget representing a digital book or movie and have that permission apply to all the devices within that user's domain while, at the same time, preventing those permissions from applying to other chambers within other domains of the realm 200.

Unlike conventional file systems and their volumes, chambers can, in certain embodiments, be interconnected. For example, a didget can contain a link or other reference to another didget in a different chamber within the same domain. Changes made to one chamber can trigger automatic updates to the other chambers within the domain. For example, if a software program was installed and authorized in chamber A 220a, the didget manager 214 could copy all the didgets associated with that software program, as well as the permission to use the program, to chamber B 220b within the same domain 224a the next time chamber B 220b was connected to the network. Moreover, unlike conventional file systems that require applications to copy and/or synchronize data, the didget manager 214, in certain embodiments, can perform such operations between chambers within the same domain independent of any application-level program.

In certain embodiments, each domain is assigned an identifying number, alphanumeric code or other like value that remains the same throughout the life of each chamber within it. Moreover, each chamber within a particular domain could have a table or other like record of all other chamber identifiers within the domain and the state of each chamber at the time of its last synchronization operation.

In certain embodiments, the didget manager of a domain can limit the number of chambers created in the domain based on the type of domain. Such embodiments would be especially useful when dealing with metered didgets that are paid for by a user (e.g., didgets representing digital content such as books, movies, music or the like), thereby limiting the number of chambers on which such metered didgets could be copied. For example, a data domain can be categorized as either anonymous or registered. In certain embodiments, any user and/or application can be allowed to create an anonymous domain, which would hold only up to a certain number of chambers (e.g., five chambers).

If a user wanted to create more than the maximum number of chambers allowed in an anonymous domain, the user could obtain permission to create a registered domain, which would have an assigned domain identification. For example, the user could contact a central web service or other third-party registration authority responsible for distributing one or more keys for allowing creation of a registered domain having a plurality of chambers (e.g., more than five) and/or tracking the domain registrations. Such registered domains could be especially useful in a company or organizational setting that uses enterprise licenses for content. Thus, the registered data domains would provide a proper accounting of the number of authorized didgets.

In certain embodiments, any user that wanted a registered domain could provide the necessary information (such as company name, address, and contact information as well as the number of chambers that would exist within the registered domain) to the registration authority in order to obtain a registration certificate that could be applied to an existing domain or be used to create a new domain. This certificate would authorize the didget manager to create a specific number of chambers that would all share the same domain. For example, a company that wanted its one hundred computers to each have a separate chamber that was a member of the company's data domain could apply for a certificate authorizing up to one hundred chambers to be created.

Figure 3:
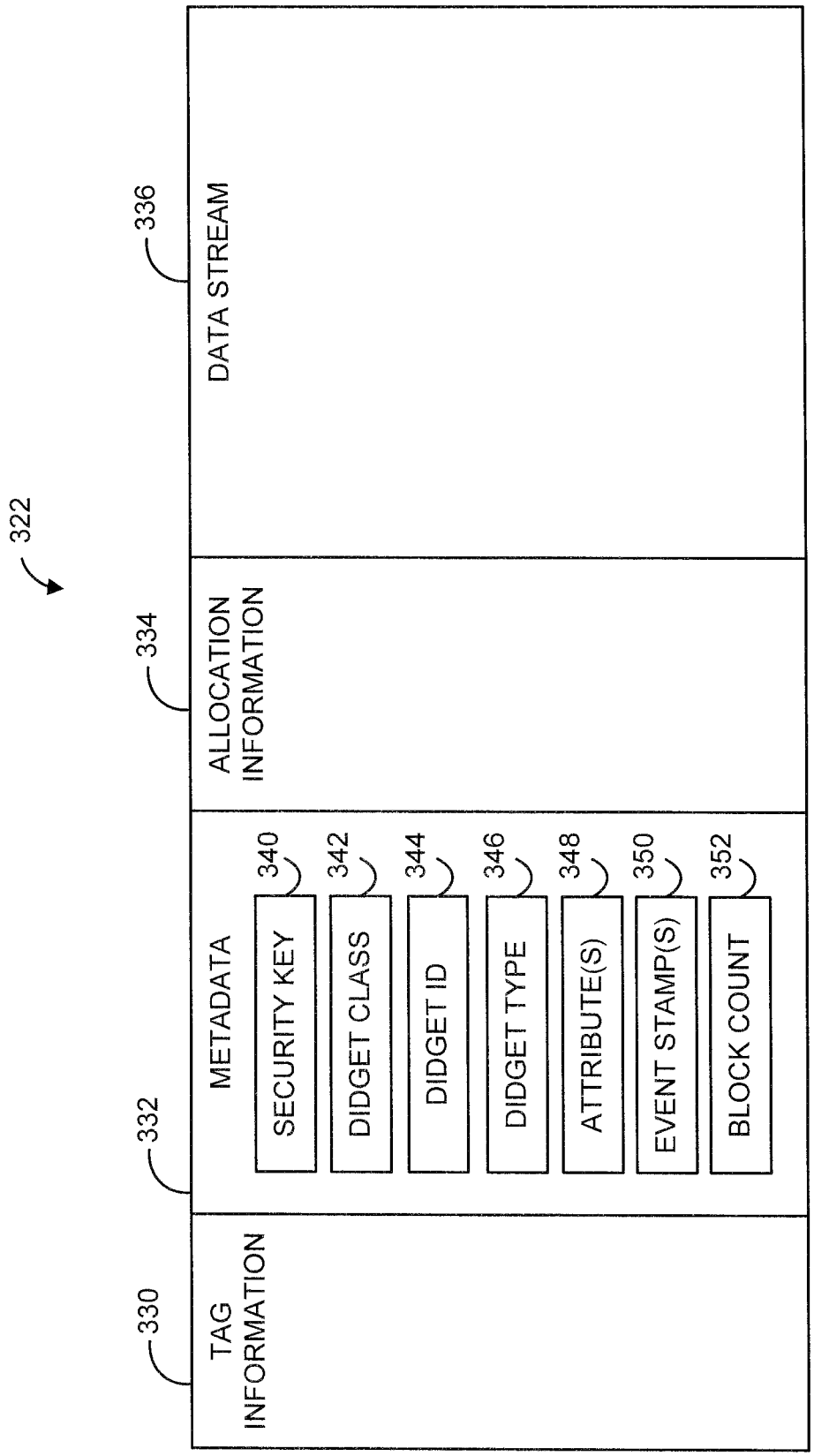
FIG. 3 illustrates a data structure of a didget usable with the data management system of FIG. 1, according to certain embodiments of the invention.

FIG. 3 illustrates an exemplary embodiment of a data structure of a didget 322 usable with the data management systems described herein. In certain embodiments, the didget 322 comprises a body of data, or payload, with accompanying metadata concerning the content, security and/or other attributes of the data. In certain examples, the didget manager 214 assigns the metadata to the content. As illustrated, the didget 322 comprises a plurality of fields, including a tag information field 330, a metadata field 332, an allocation information field 334 (the three of which may be collectively referred to generally herein as "metadata" of the didget 322) and a payload or data stream field 336. In certain embodiments, only the didget manager 214 has direct access to the metadata of the didget 322.

The tag information field 330 can include optional metadata, or "tags" attached to the didget 322. For example, the tag information field 330 can include more detailed metadata and/or user-assigned metadata that does not fit within the metadata field 332. In certain embodiments, each tag comprises a <key:value> pair wherein each value comprises a number, alphanumeric string, or other data. In certain embodiments, the tag information advantageously provides for improved searching and categorization and for advanced customization by the user.

In one example, the tags attached to the didget 322 can be used by the control program 114 or didget manager 214 to determine if the didget 322 matches a particular query or request by one of the application(s) 108. For instance, the application 108 may request from the control program 114 a list of all photo didgets that have a tag of <event:birthday party> attached.

The metadata field 332 comprises information regarding the didget 322 and its associated contents. In certain preferred embodiments, the metadata field 332 is advantageously sized with a small data footprint to allow for expedited searching and management. For instance, in certain embodiments, the metadata field 332 is allocated sixty-four (64) bytes of data.

When compared to the one to two kilobyte metadata fields associated with traditional file systems, the more compact metadata field 332 of the didget 322 can provide for searching up to sixteen times faster.

In certain embodiments, the metadata field 332 comprises a plurality of subfields, as further depicted in FIG. 3. In certain further embodiments, some of the subfields can be designated as read-only once they are first populated with the metadata (e.g., write once read many (WORM) subfields). That is, such WORM subfields are writable when the didget 322 is created and afterwards becomes read-only. As shown, the metadata field 332 includes a security key subfield 340, which can include read and/or write keys for relating to the security of the didget 322. A didget class subfield 342 includes information on the classification of the didget that defines how the contents and/or permissions associated with the didget can be copied between chambers and/or domains.

In certain embodiments, the didget class subfield 342 cannot be modified and comprises two bits representing four classes of didgets: public, private, semi-private and system. In certain embodiments, the "public" class means that data from the didget can be synchronized between any chambers in the realm (i.e., in any domain), although permission to access and/or use the data is not also copied. This type of class could be used for metered didgets that contain licensed content (e.g., music, video or the like) as discussed above or other read-only files that are published for general distribution. The "system" class indicates that data and permission of the didget is not synchronized across chambers, but is unique to the chamber in which the didget resides. The "private" and "semi-private" classes signify that the data and permissions of the particular didget can be synchronized between any chambers within the same domain.

A didget ID subfield 344 includes a unique identification of the didget 322. In certain embodiments, such a unique identifier cannot be modified and comprises a numeric value of sixty-two bits. In this way, there is no danger that a didget would ever have the same didget ID as another, non-identical didget in the domain. In yet other embodiments, the didget ID subfield 344 can comprise a larger or smaller size and/or an alphanumeric value, although pure numeric values can be advantageous in that they do not require time- or resource-intensive string searches to find a didget, as is generally required with file names. In preferred embodiments of the invention, didgets are provided identifiers that represent the order in which they were created (e.g., via consecutive numbering) within the domain.

In comparison to a conventional file, a didget does not need to have a name to identify the data object. Rather, each didget can be assigned the didget ID, which remains the same throughout the life of the didget. Unlike a Unix file system inode number, this didget ID does not depend on where the metadata for the didget is stored within a system table. In certain embodiments, if a didget is created with a didget ID of "20," for example, that particular didget will retain that didget ID until it is deleted and purged from the system. In certain embodiments, didget IDs are not recycled, so once a didget is deleted, a newly created didget is not assigned that same number or identifier. If a didget is copied from one chamber to another, the copy of the didget can retain the same didget ID.

Moreover, in certain embodiments of the invention, specific didget IDs can be reserved across domains for a particular class and/or type of didget. This would especially be important for public didgets, as discussed above. For example, a didget ID of 100 could be reserved for television movie menus. This consistency across domains would allow a processor on any television to automatically know the ID of the didget it would need to access in order to bring up a movie menu. In yet other embodiments, reserved didget IDs could be used similarly with semi-private didgets and/or could be passed between applications that both utilize the same didget.

In certain further embodiments, didgets can be given names, but these names would be treated as mere labels that can be advantageously changed without altering the didget ID. For instance, a didget could be assigned multiple labels as well, so a single didget could be assigned twenty different names, each in a different language, for example. These labels could be stored in a name space directory on a menu didget (e.g., as a <didget ID:label> pair).

The metadata field 332 further comprises a didget type subfield 346 that identifies the type, or subclass, of content of the didget 322. In certain embodiments, the didget type subfield 346 is allocated sixteen bits (e.g., read-only) to define sixteen didget types in order to provide for rapid searching of the didget type. For example, such types could include, but are not limited to (many of which are described in more detail herein in other contexts): data didgets, activator didgets, list didgets, policy didgets, security didgets, menu didgets, collection didgets, marker didgets, link didgets, configuration didgets, subtype schema didgets, tag value didgets, tag record didgets, tag schema didgets and reference didgets. Of course, in other embodiments of the invention, more, fewer or different types of didgets could be used.

An attributes subfield 348 can contain information related to the attributes of the data stream 336 and/or the didget 322. In certain embodiments, the attributes subfield 348 can be allocated sixteen bits to indicate the presence (or absence) of sixteen separate attributes. Examples of attributes could include, but are not limited to (many of which are described in more detail herein in other contexts): bootable (the data stream contains code that can be used to boot a device), name space (the data stream contains namespace information like a custom directory), metered (didget must be activated before the data stream can be accessed), point generator (the data stream contains information (e.g., advertisement, survey, etc.) that can be used to generate media points), deleted (didget has been deleted but not yet purged from the system), encrypted (the data stream has been encrypted), compressed (the data stream has been compressed), sparse (the data stream has logical holes), read-only (the existing data stream cannot be altered), appendable (additional data can be added to the end of a read-only data stream), self-destruct (the data stream will be destroyed after some specified event (e.g., certain time has passed or use count is reached)), multiple-tags (the didget has more than one value of a given tag), single copy (if a copy of the didget is made, the original is destroyed), disposable (space for the data stream can be confiscated by the didget manager), activated (a metered didget has gone through the activation process and there is an activator didget associated with it), and/or quarantined (the data stream has not yet been cleared by anti-virus or other verification process). Of course, in other embodiments of the invention, more, fewer or different attributes can be used as circumstances warrant.

An event stamp(s) subfield 350 can provide detailed information as to when the didget 322 was created and/or modified. In certain embodiments, the event stamp value comprises a number count that correlates with an event counter in the particular chamber (e.g., associated with an instance of the didget manager). Thus, the event stamps comprise numbers that are relative to each other based on the order of occurrence, as discussed above, and are used in connection with marker didgets to determined absolute times, if needed.

In certain embodiments, each chamber in the realm has its own event counter that is incremented every time an event happens within that chamber. Moreover, each chamber within a domain can have a table or other record that lists the event counter values of the other chambers within that domain at the time of their last synchronization event. In other words, if two chambers are both in the same domain, then when the two chambers were last synchronized, a first chamber records the value of second chamber's event counter (e.g., 5,000), and the second chamber records the value of the first chamber's event counter (e.g., 300). In that manner, the next time the two chambers are in contact with each other, the didget manager can tell how many events each chamber has independently executed since their last synchronization event.

A block count subfield 352 identifies how many blocks have been allocated for the didget 322.

In preferred embodiments, the tag information field 330 and the metadata field 332 are treated as two distinct fields for searching purposes. For instance, when the didget manager 214 receives a search query, it can execute a two-tiered search process by initially scanning the sixty-four byte metadata field 332 as a first pass through the didget metadata. If needed, the didget manager 214 could then run a second pass through the tag information contained by the didgets identified in the first pass. This two-tiered search structure, with a first, expedited pass being through a relatively small data footprint allows for more rapid results rather than needing to sift through kilobytes of data for each data object. An example of this two-tiered search process is provided in connection with FIG. 9.

As can be appreciated, the various fields and/or subfields of the didget 322 are provided for illustration purposes and, in other embodiments, one or more of the fields can be combined, removed or divided into multiple fields. For instance, in certain embodiments, the tag information field 330 can be combined with the metadata field 332 or removed all together. Moreover, the tag information field 330 can by dynamically expandable to accommodate additional metadata.

Moreover, in certain embodiments, data didgets can be further assigned one or more of sixteen data types. These data types could include, for example, audio, image, software, script, text, structured data, video, and document subtypes. These data types could even be advantageously broken down further into data subtypes. For example, a file in a conventional file system cannot be classified as containing both a picture and text. Rather, such files are generally given a more generic type such as "document." Using the data structure of FIG. 3, on the other hand, data didgets can have multiple subtypes stored in the metadata field 332, wherein multiple related or unrelated data subtypes can be stored independent of each other. For instance, in the example document referred to above, the didget could be assigned both an "image" subtype and a "text" subtype. As a result, separate queries to find all the "pictures" and all the "text" didgets would each identify that data object. In another example, instead of the generic ".exe" extension that is generally assigned to an application (or executable file), didgets that contain program code (or a "software" data type) could be further identified as a "Windows 7 Application," a "Linux Version 3 Compatible Application" a "Mac OS X Application," or the like In certain embodiments, the data subtype field could be allocated two bytes to provide for tens of thousands data subtypes for each data type, thus requiring four bytes between the two. For example, certain subtypes could be globally defined for all domains while other subtypes could be defined locally by a user in a subtype schema didget. In yet other embodiments, other types or means of categorizing or identification could be used.

In certain embodiments of the invention, every didget comprises at least the didget class subfield 342, the didget ID subfield 344 and the didget type subfield 346, wherein each of these subfields is permanently set as a read-only (non-editable) subfield once it is first populated with data. Moreover, the metadata described herein can advantageously be created by and/or associated with the corresponding data stream (or content) by the didget manager.

The allocation information field 334 comprises information for tracking the location of the blocks of the data stream 334. In certain embodiments, the allocation information field 334 contains a fragment list, similar to what is maintained in conventional file systems. In yet other embodiments, the allocation information field 334 contains a table or other record for maintaining block location information.

The data stream field 336 stores the actual content of, or values stored by, the didget 322, similar to the data content stored in conventional files. In certain embodiments, the data stream field 336 can reach sizes of up to 18 terabytes.

Figure 4:
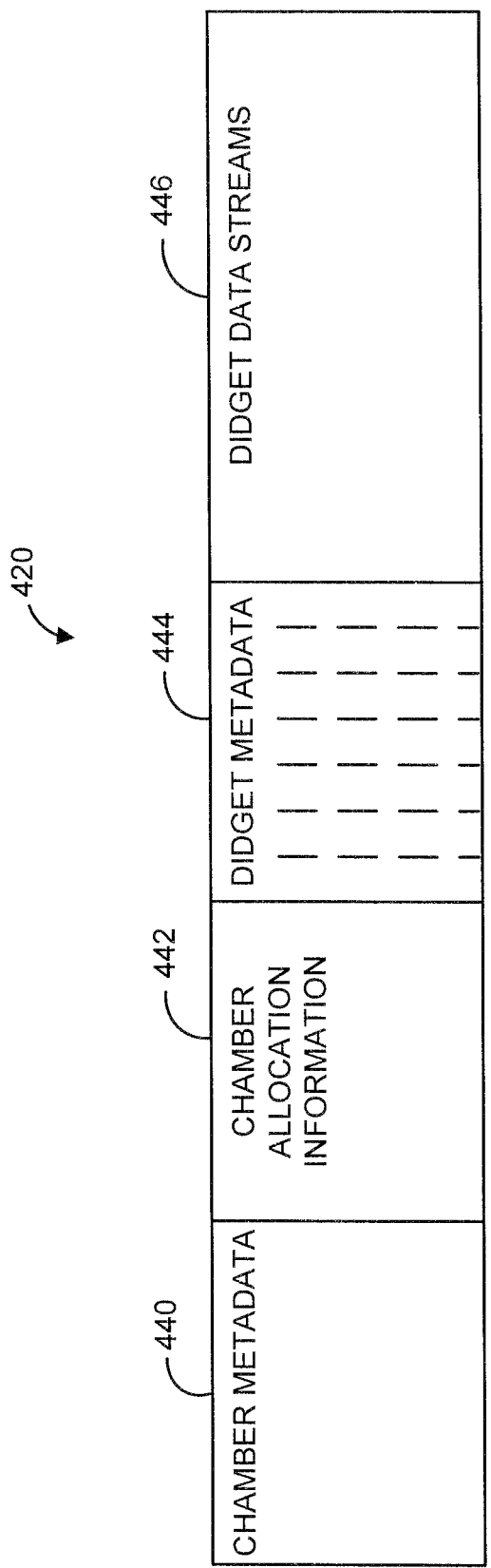
FIG. 4 illustrates a data structure of a chamber usable with the data management system of FIG. 1, according to certain embodiments of the invention.

FIG. 4 illustrates an exemplary embodiment of a data structure of a chamber 420 usable with the data management systems described herein. Similar to the didget 322, the illustrated chamber 420 comprises multiple fields of metadata (i.e., chamber metadata field 440, chamber allocation information field 442 and didget metadata field 444) and working data, or didget data stream field 446.

The chamber metadata field 440 comprises information and/or attributes of the chamber 420. For instance, the chamber metadata field 440 can include a unique ID, a domain ID, a current event value (e.g., corresponding to the chamber event counter), synchronization records, personalized labels (e.g., "my favorite music" or "my desktop PC"), combinations of the same and the like.

The chamber allocation information field 442 includes information regarding the block storage, such as the block storage 118 within the chamber 420. For instance, in certain embodiments, the chamber allocation information field 442 includes a free list, reserved list and disposable list of the blocks within the chamber 420. The free list can identify data blocks that are empty or available for storage. The reserved list can be designed to reduce fragmentation by identifying blocks within the chamber 420 that should be allocated last, thereby allowing the data of certain didgets to grow over time without substantial fragmentation. The disposable list can identify those data blocks that have been prefilled with disposable data but that are available to be overwritten at any time. In such an embodiment, the didget manager 214 would not issue an "out of disk space" error message until both the free list and disposable lists of the chamber 420 were empty (or near empty).

Although the chamber allocation information field 442 is described in one embodiment as containing "lists," it should be recognized that various other forms of tracking data can be used, such as tables or the like.

Didget metadata field 444 comprises the metadata of the didgets within the chamber 420. For instance, in certain embodiments, the didget metadata field 444 comprises the didget metadata 332 from each of the didgets 322 in the chamber 420. This aggregation of didget metadata facilitates data management, such as data searching, within the chamber 420.

In certain embodiments, the didget metadata field 444 is configured to be segmented and/or scaled out so that metadata of a single chamber can be managed across multiple servers.

The didget metadata field 444 data can be equally divided over such servers, such as being split evenly into multiple portions. In other embodiments, the didget metadata field 444 data can be replicated across multiple servers to preserve redundancy and allow for parallel processing.

The didget data streams field 446 includes the body of didget data within the particular chamber 420. For instance, in certain embodiments, the didget data stream fields 446 can comprise the data from the data stream fields 336 of each of the didgets 322 within the chamber 420.

Figure 5:
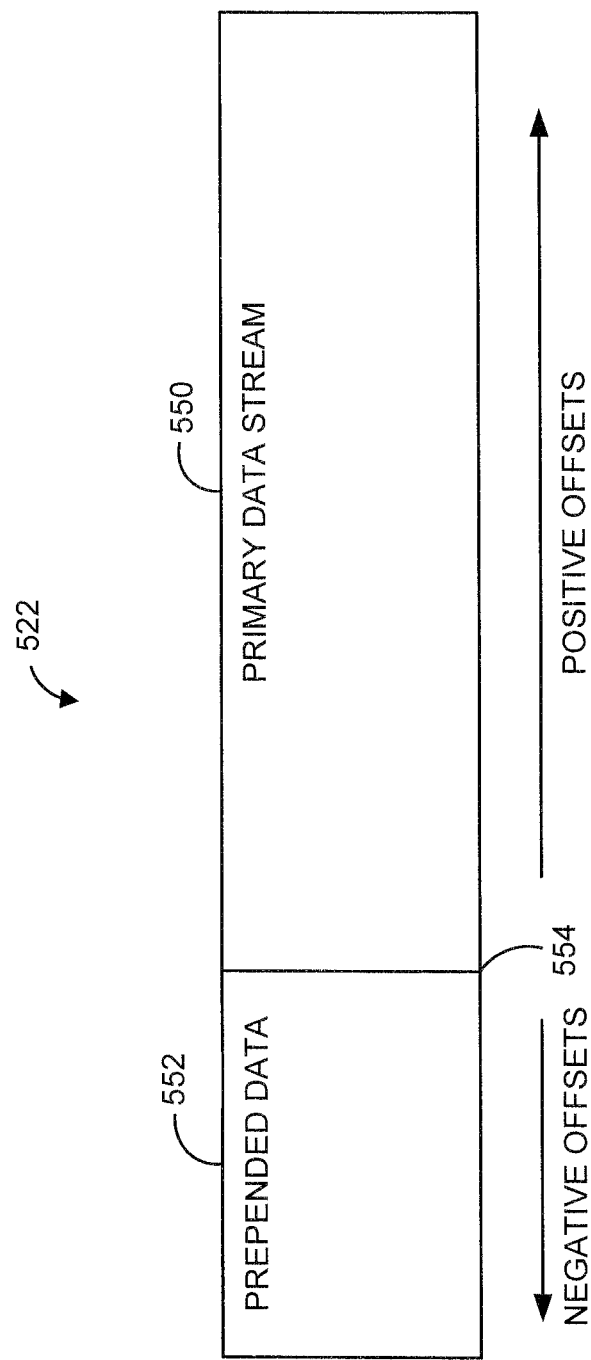
FIG. 5 illustrates a data structure of a didget configured to receive prepended data according to certain embodiments of the invention.

FIG. 5 illustrates an exemplary embodiment of a data structure of a didget 522 that is capable of receiving prepended data to its data structure. As illustrated the didget 522 includes a primary data stream field 550 and a prepended data field 552, the two being separated by a zero offset 554. As shown, the primary data stream field 550 comprises data having positive offsets and can include, for example, the data stream field 336. The prepended data field 552, on the other hand, comprises data having negative offsets and can include, for example, data from the optional tag information field 330.

In particular, the illustrated didget 522 is configured to have extended attributes inserted into its data structure by an application or by the didget manager 214 without causing compatibility problems for existing programs. In particular, such extended attributes are "prepended" to the data structure such that the extended attributes are stored at negative offsets within the primary data stream field 550.

In general, when an application accesses a data stream, it can start reading from the zero offset 554, or the "beginning of the stream." With didgets, however, the application can further read or write extended attributes at negative offsets to the beginning of the data stream. For example, an application could read in four kilobytes of negative data by reading four kilobytes starting at offset "−4096". In this manner, any new applications created to handle these attributes could access the didgets without breaking the compatibility of existing applications that do not know how to handle negative offsets.

In certain embodiments, each didget that has a negative data stream may have a flag set in its attribute subfield 348 in the standard metadata field 332. The number of blocks containing this negative data stream could be recorded there as well. In certain embodiments, the didget manager 214 can provide interface calls to indicate if a particular didget has the prepended data field 552 and, if so, how many bytes are contained therein. This can be especially important in the case of copying the didget 522 so that both the negative stream data as well as the positive stream data are copied.

Prepended data can be especially useful in the case of license templates. For instance, the didget 522 can have license template information stored in the prepended data field 552 that relates to use of the data stored in the primary data steam field 550. In certain embodiments, the license template data can include terms for activating the data as specified by the content creator, a one-time use fee, a timed use contract, a usage based contract, a sample of the data, a trial period, combinations of the same or the like. Other information can include a web address for online help, instructions on how to use the data, who created the data, metered information, combinations of the same or the like. As one example, an owner or creator of a didget including a digital song can specify in the license template that a user can listen to the song once for free and then can activate it for unlimited use for one dollar.

Figure 6:
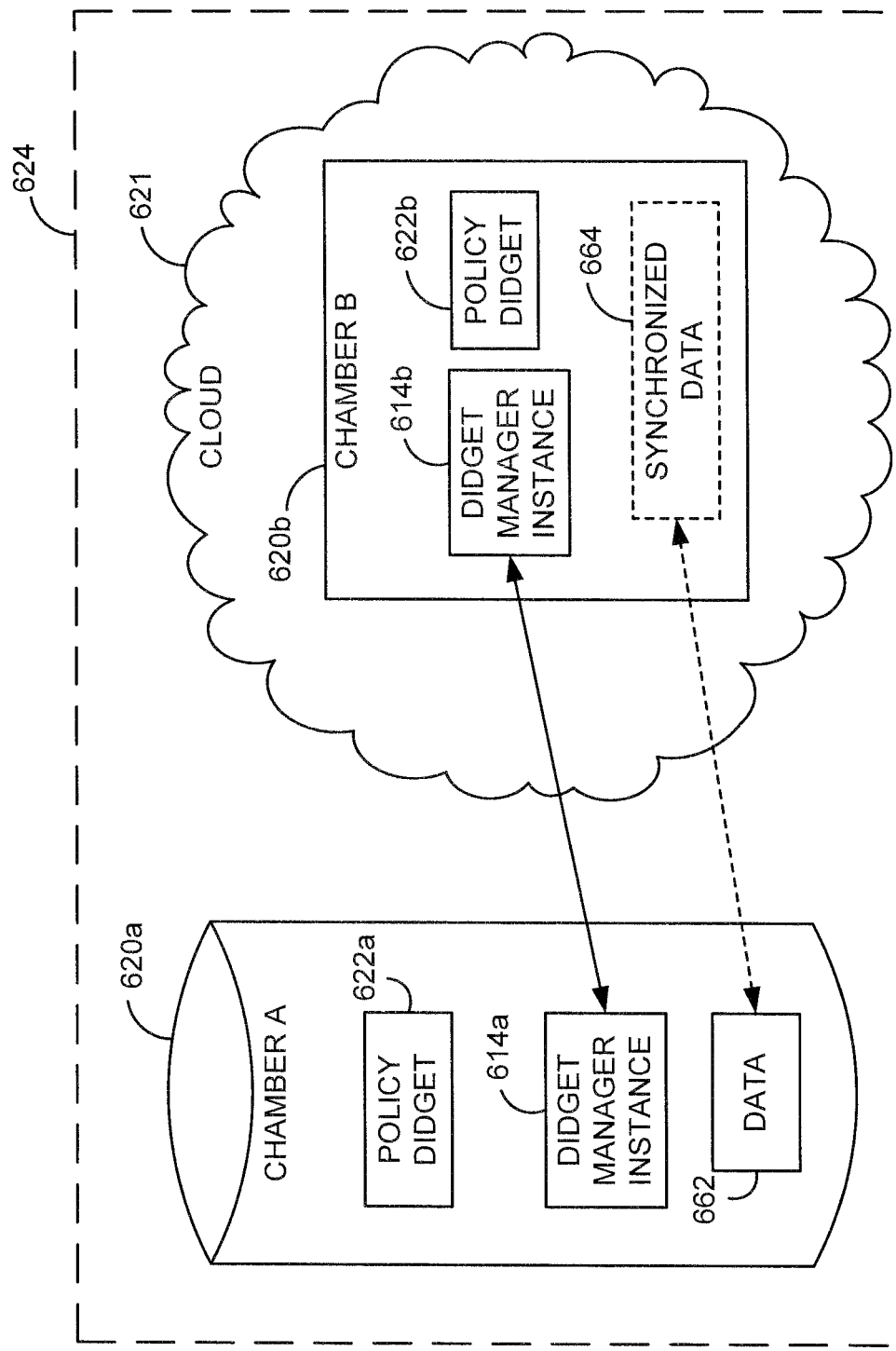
FIG. 6 illustrates a block diagram of an embodiment of a data management system comprising a policy for synchronizing data across heterogeneous storage platforms within a domain.

Now that embodiments of the data management system have been described above with respect to FIGS. 1-5, FIGS. 6-9 provide examples of implementing portions of such data management systems. For example, FIG. 6 illustrates a block diagram of an embodiment of a policy-based data management system comprising a policy for synchronizing data across a domain 624. In particular, the domain 624 encompasses a chamber A 620a including a first didget manager instance 614a, a first policy didget 622a and data 662. As shown, the first didget manager instance 614a communicates with a second didget manager instance 614b associated with a cloud architecture 621 to create synchronized data within the cloud 621 based on the data 662.

For example, the first policy didget 622a may include a policy that instructs the first didget manager instance 614a to push a copy of data 662 to the cloud 621 to create and/or update the synchronized data 664. In certain embodiments, this replication can take place as a full backup, an incremental backup or a differential backup. In yet other embodiments, the replication can take place on a continuous basis in real-time as changes are made to the data 662.

Within the cloud 621, a second policy didget 622b can instruct the second didget manager instance 614b to receive the copy of the data from the chamber A 620a. In certain embodiments, the second didget manager instance 614b can receive the entire copy of the pushed data. In other embodiments, the second didget manager instance 614b, based on instructions received from the second policy didget 622b, each within a chamber B 602b, can allow only a select portion of the copied data to be added to the synchronized data 664. For example, the second policy didget 622b may include a policy for pulling only certain types of data, such as financial records, documents or the like.

Although the data management system depicted in FIG. 6 has been described with reference to particular embodiments, it shall be understood from the disclosure herein that the system can take on alternative configurations. For example, the synchronization of data could be managed by only a single policy didget in either the chamber A 620a or the chamber B 620b within the cloud 621.

Figure 7A:
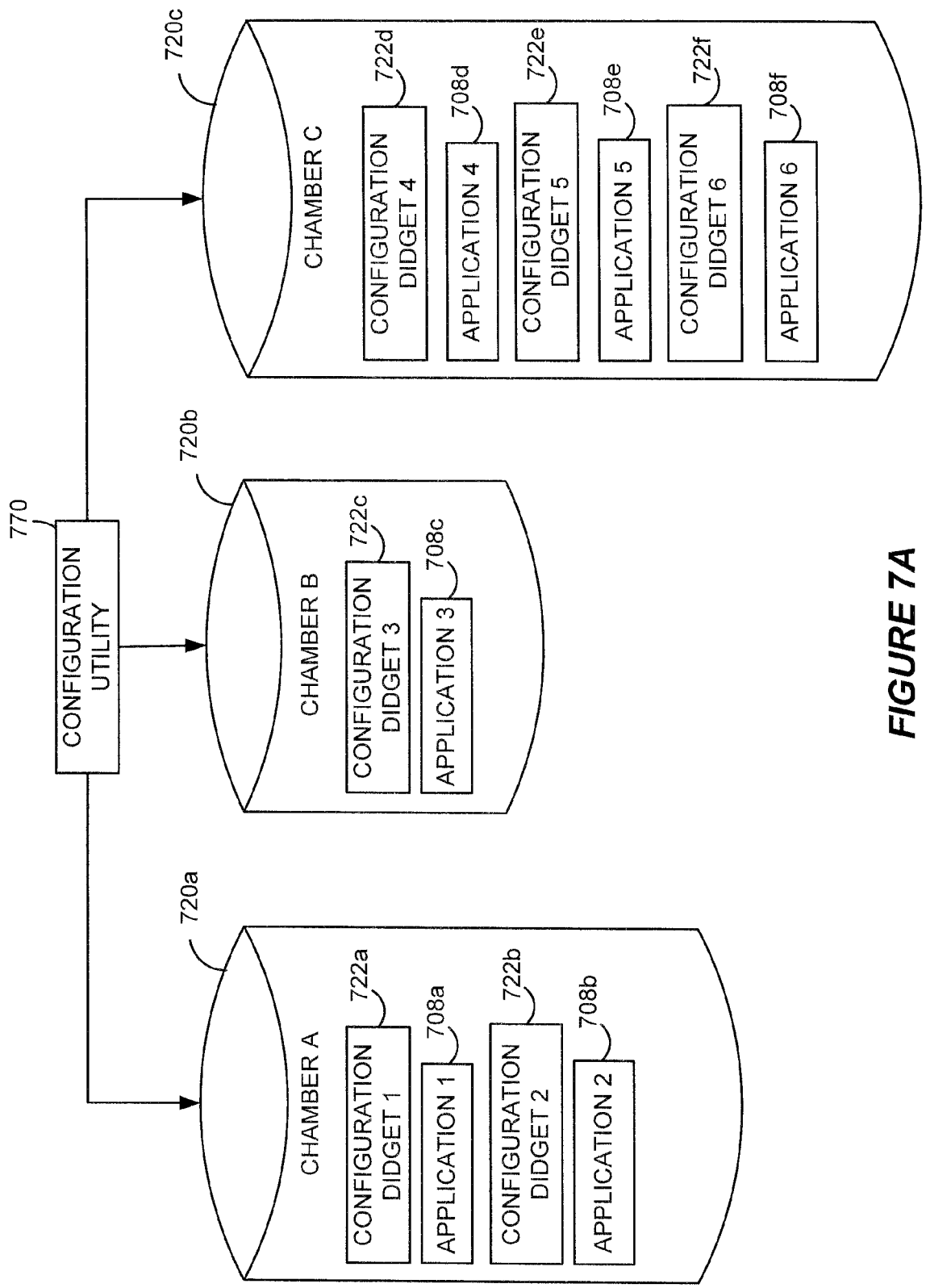
FIG. 7A illustrates a block diagram of an exemplary embodiment of a data management system displaying the use of configuration didgets.

FIG. 7A illustrates a block diagram of an exemplary embodiment of a data management system displaying the use of configuration didgets. As discussed above, configuration didgets can advantageously store important information related to the functioning of applications within the same chamber.

As shown in FIG. 7A, three chambers (chamber A 720a, chamber B 720b, and chamber C 720C) each include a number of applications and associated configuration didgets. In particular, chamber A 720a includes application 1 708a and configuration didget 1 722a as well as application 2 708b and configuration didget 2 722b. Chamber B 720b includes application 3 708c and configuration didget 3 722c. Likewise, chamber C 720c includes application 4 708d and configuration didget 4 722d, application 5 708e and configuration didget 5 722e, and application 6 708f and configuration didget 6 722f.

Figure 7B:
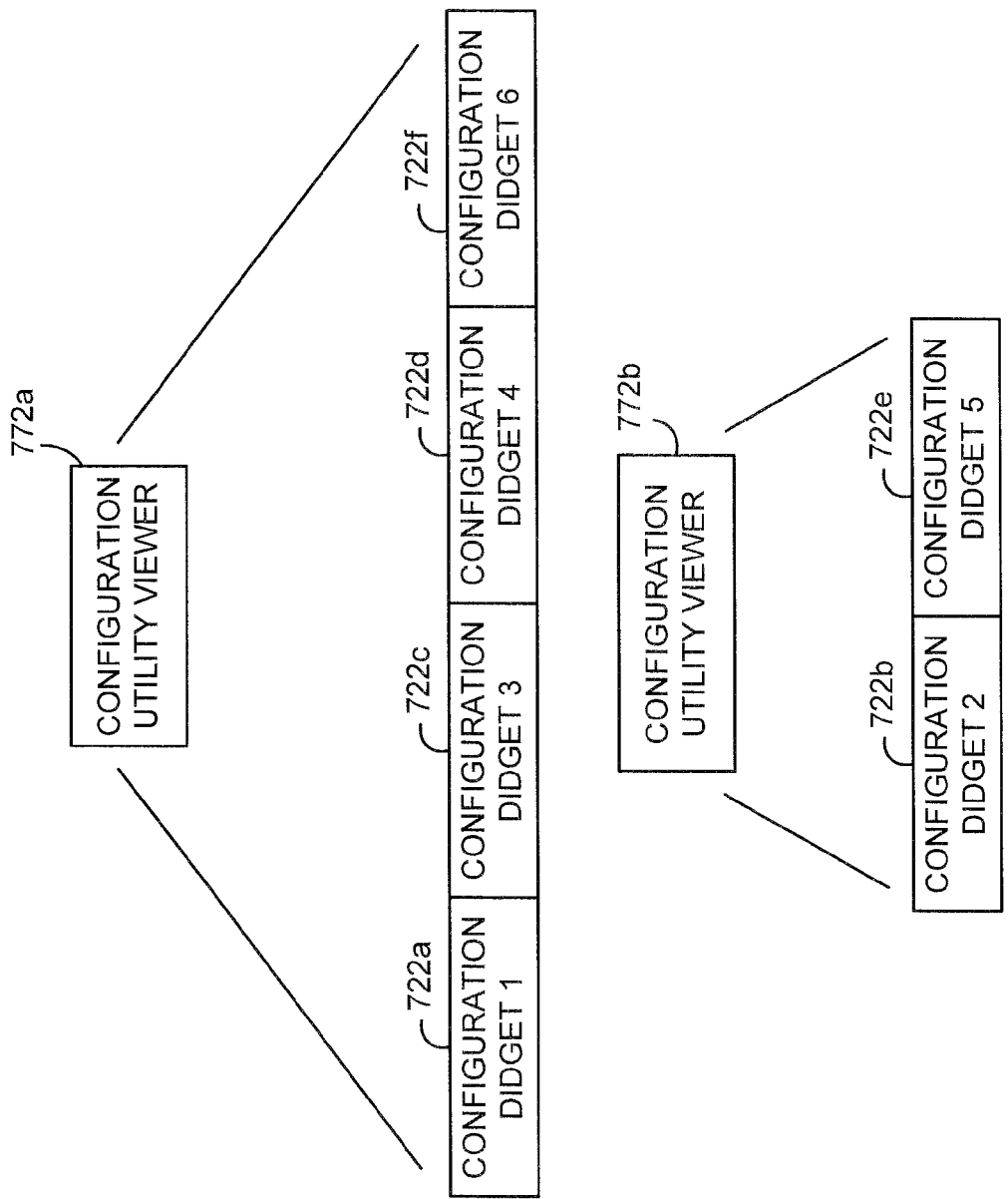
FIG. 7B illustrates a block diagram of a data management system providing a unified view of a plurality of configuration didgets.

Each of the chambers communicates with a configuration utility 770 that manages each of the configuration didgets and that can present a unified view to the user of such didgets. For instance, as shown in FIG. 7B, a configuration utility viewer 772a can provide a user with access to select configuration didgets of the multiple configuration didgets within the domain. In particular, the configuration utility viewer 772a presents to the viewer a view of four configuration didgets (722a, 722c, 722d and 722f). Such a view could be based on the configuration didgets being associated with certain types of applications, such as, for example, WINDOWS applications.

A separate configuration utility viewer 722b presents a different set of configuration didgets to a user, namely configuration didget 2 722b and configuration didget 5 722e.

Figure 8:
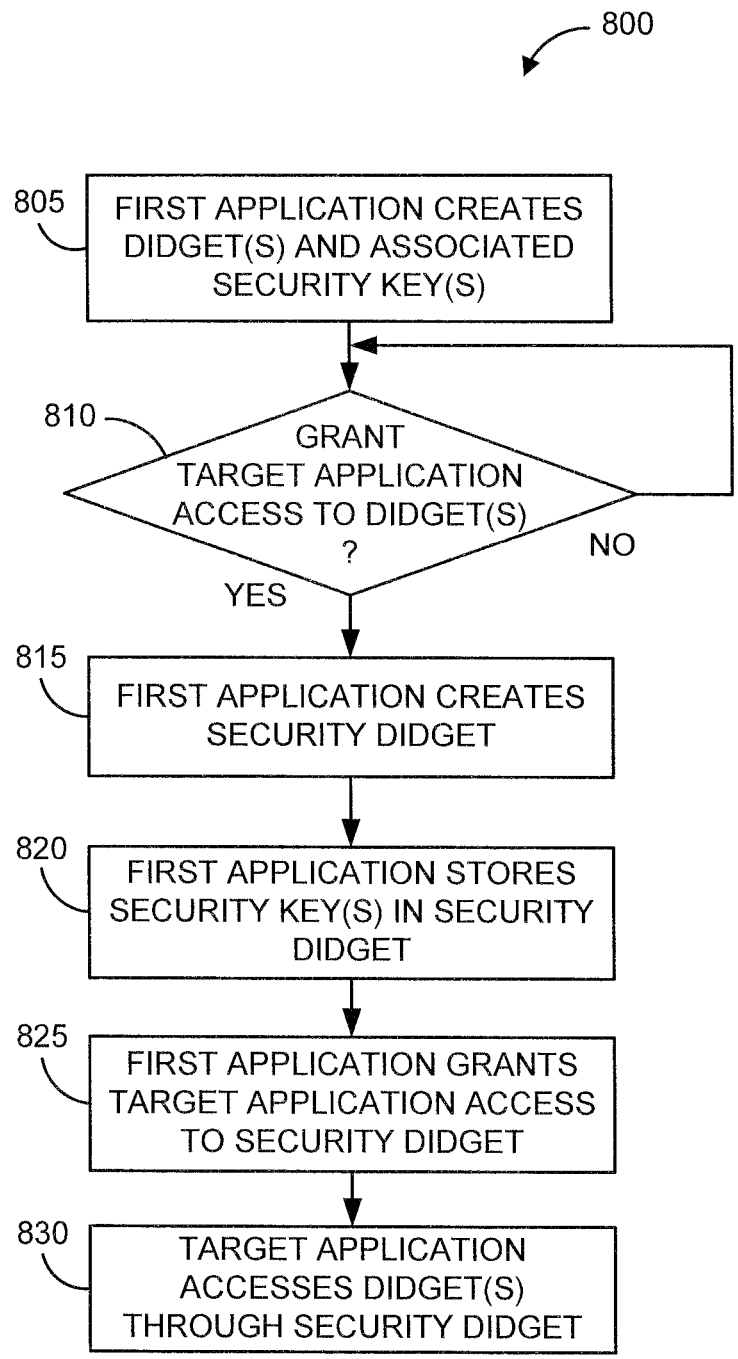
FIG. 8 illustrates a simplified flowchart of a secure didget access process in accordance with certain embodiments of the invention.

FIG. 8 illustrates a simplified flowchart of a secure didget access process 800 in accordance with certain embodiments of the invention. In particular, the access process 800 concerns how one application can access didgets created by another application in a secure and authorized manner.

The process 800 begins with Block 805, wherein an application, such as application 108, creates one or more didgets and their associated security keys for obtaining access to said didgets. At some point thereafter, it is decided that the first application is to grant a target application access to the created didget(s) (Block 810). The first application then creates a security didget (Block 815) and stores the security keys associated with the didget(s) in the security didget (Block 820).

At Block 825, the first application grants the target application access to the security didget. In certain embodiments, this block comprises the first application passing a security key to the target application than enables access to the security didget. The target application then uses the security didget to access the didget(s) first created by the first application.

The process 800 provides the advantage of allowing other applications access to one or more didgets without providing such other applications with direct access to the security keys for those didgets. Rather, the security keys are stored in the security didget. In certain embodiments, the security didget can be protected via read-only attributes and/or its own read/write keys and/or available for access during a certain duration of time. For example, the first application could create the security didget and assign it a lifetime of one day, after which the security didget would "self-destruct" (e.g., automatically erase the security keys contained therein). During that lifetime, any allowed application could use the security didget to access the pertinent didgets. However, after expiration of the assigned lifetime, the security didget would no longer be available for use by the applications to access the didget(s).

For instance, based on the selection of the self-destruct attribute of the security didget, the didget manager 214 could automatically delete the security didget. This action could be based on a passage of time, as discussed above, or on another triggering event, such as after a certain number of times that the security didget has been accessed. Moreover, even though the "self-destruct" feature has been described herein with respect to security didgets, the same feature can be implemented with any type of didgets (e.g., after a data didget representing a digital movie has been accessed a certain number of times) in the disclosed data management systems.

Figure 9:
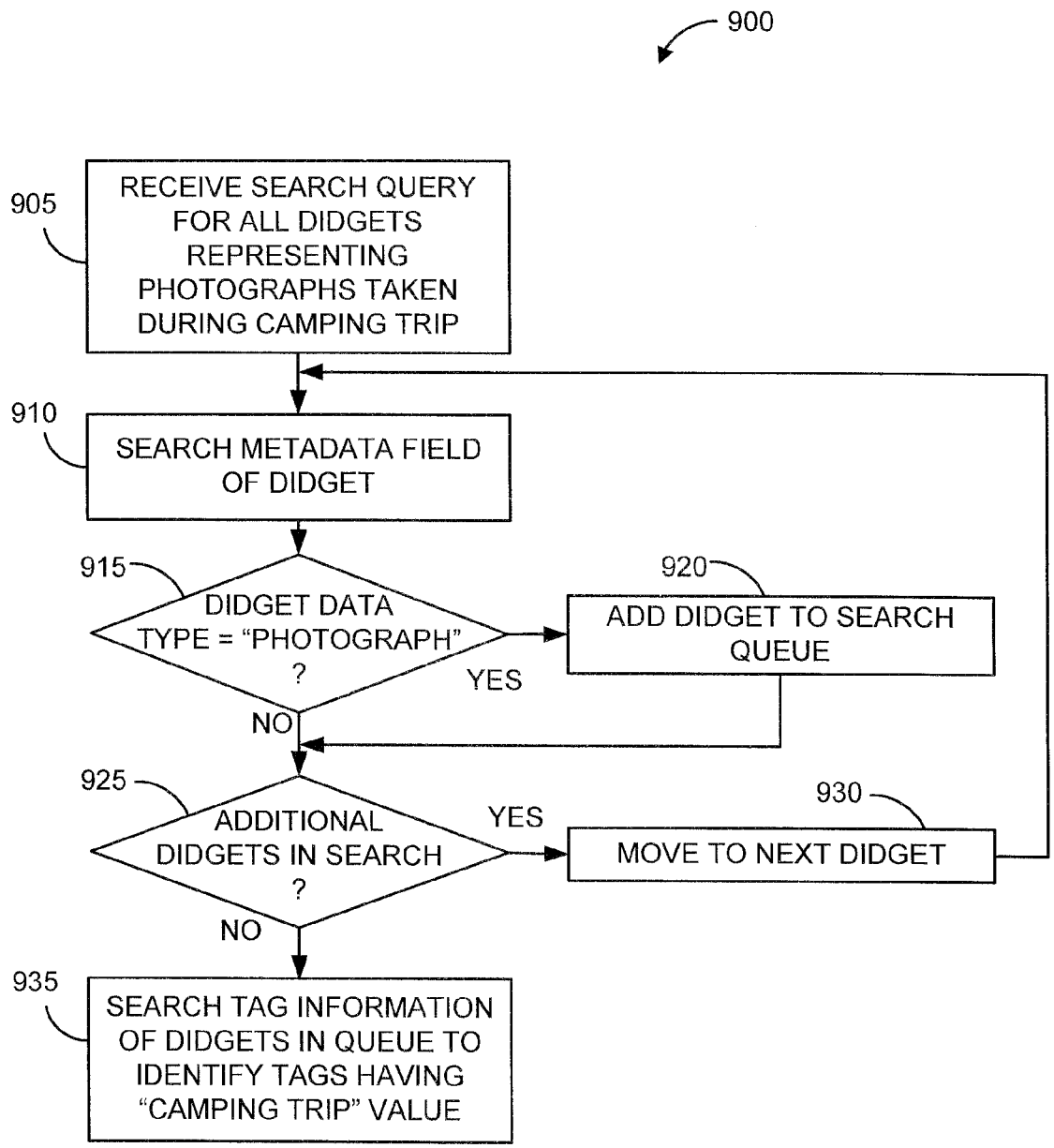
FIG. 9 illustrates a simplified flowchart of a search process in accordance with certain embodiments of the invention.

FIG. 9 illustrates a simplified flowchart of a search process 900 in accordance with certain embodiments of the invention. In particular, the search process 900 provides a two-tiered search of metadata contained within a didget so as to expedite searching. For exemplary purposes, the process 900 will be described with reference to the fields of the didget data structure 322 illustrated in FIG. 3 and the data management elements illustrated in FIG. 2A.

The search process 900 begins with Block 905, where the didget manager 214 receives a search query for all the didgets in the domain that contain photographs captured during a camping trip. At Block 910 the didget manager 214 searches the metadata field 332 of the first didget 222a in the domain. In certain embodiments, this search is expedited since the metadata field 332 is no larger than sixty-four bytes. For example, the didget manager 214 may search the data subtype subfield, in the metadata field 332 of all the data didgets, to determine if the didget 222a has been assigned a subtype "photograph" (Block 915). If the didget has a subtype photograph, the didget's identification (e.g., from didget ID subfield 344) can be added to a list, record or otherwise stored for later searching (Block 920).

If there are additional didgets in the domain that have not yet been searched (Block 925), the didget manager 214 moves to the next didget (Block 930) and searches its metadata. Otherwise, the process 900 moves to Block 935 to perform the second portion of the two-tiered search. In particular, the didget manager 214 can then search all those didgets that were identified as having a data didget subtype "photograph" to determine if they also have a "camping trip" tag value. In certain embodiments, this second search would be performed on the tag information 330 of each of the "photograph" didgets.

Although the process 900 has been described with respect to particular blocks, it will be understood that in other embodiments certain blocks may be divided, modified or removed. As one example, various instances of the didget manager 214 may process respective portions of either the metadata and/or the tag data in parallel to expedite the search process 900.

Figure 10A:
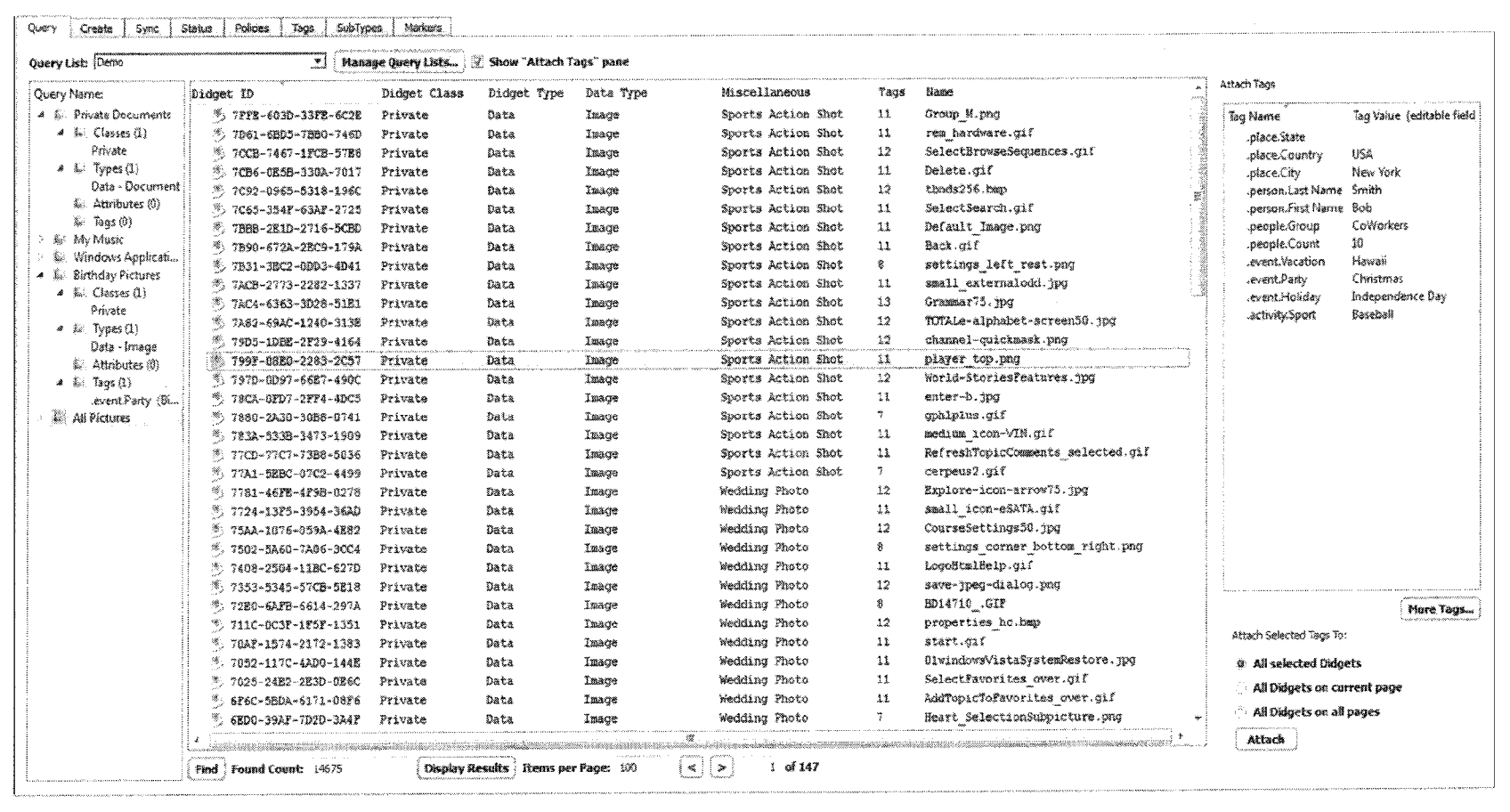
Figure 10B:
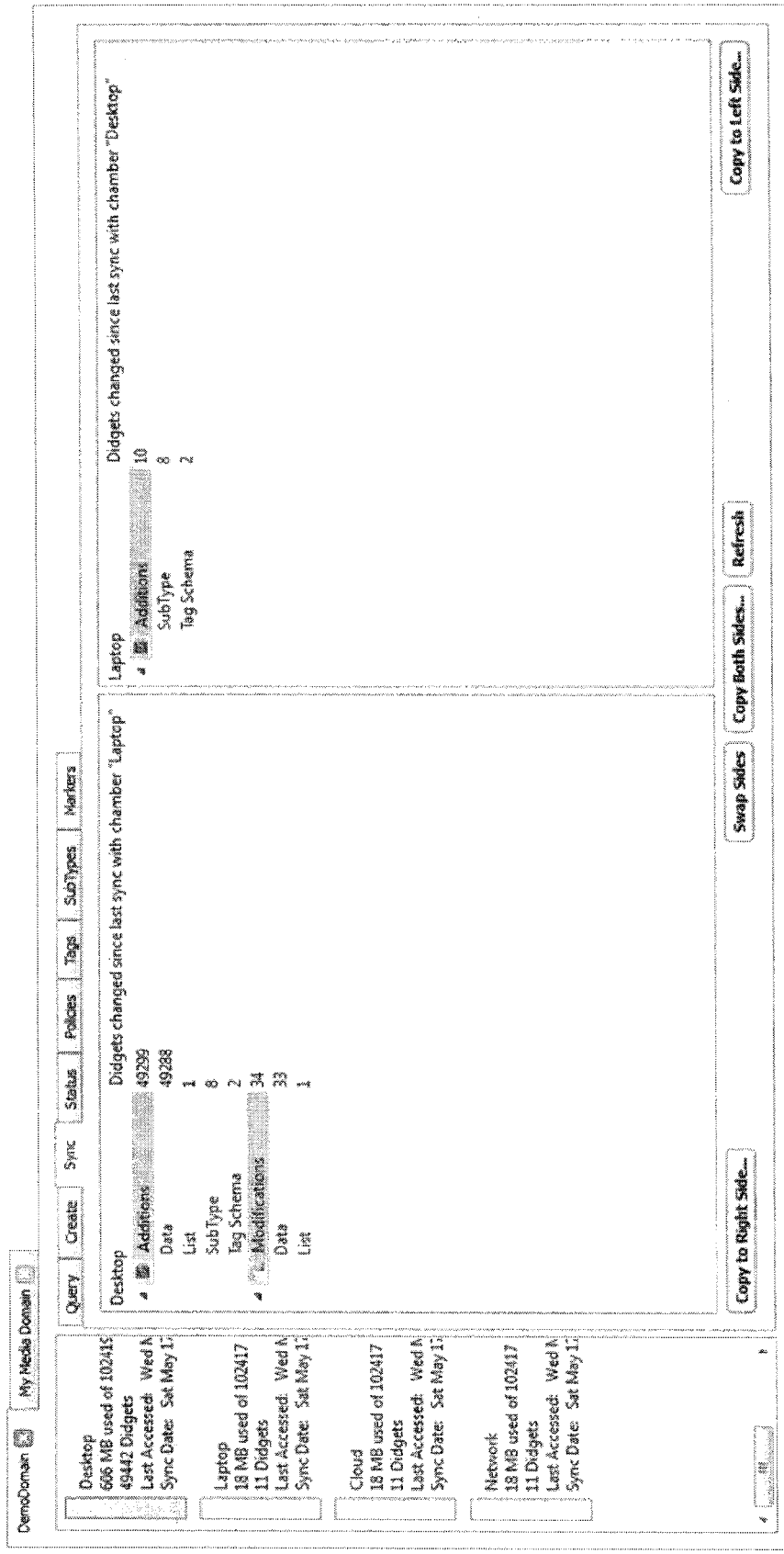
Figure 10C:

FIGS. 10A-10D illustrate various screen shots of a user interface for managing didgets within a domain according to certain embodiments of the invention. In particular, FIG. 10A illustrates an exemplary user interface for showing the results of query for all didgets within a particular domain having image data. FIG. 10B illustrates an exemplary user interface for synchronizing didgets between two chambers (i.e., "Desktop" and "Laptop") within a domain (i.e., the "Demo-Domain"). FIG. 10C illustrates an exemplary user interface for displaying the status of the "Desktop" chamber. FIG. 10D illustrates an exemplary user interface showing various marker didgets within a chamber associated with the creation, mounting and dismounting of the chamber.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Embodiments of the invention are also described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

These computer program instructions may also be stored in a computer-readable memory that can direct a computer or other programmable data processing apparatus to operate in a particular manner, such that the instructions stored in the computer-readable memory produce an article of manufacture including instruction means that implement the acts specified in the flowchart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system for managing data, the system comprising:
a control module configured to execute on a computing device;
a plurality of data objects stored on one or more physical storage devices, the plurality of data objects each further comprising,
a data stream comprising payload data, and
a plurality of write-once-read-many (WORM) metadata fields having metadata specific to the payload data of the data stream, the plurality of metadata fields comprising,
a first WORM metadata field storing a unique identification for the data object, and
a second WORM metadata field storing a data object type corresponding to the payload data of the data stream of the data object; and
at least one device driver configured to execute on the computing device to access the plurality of data objects,
wherein the data object type stored in the second WORM metadata field of a first data object of the plurality of data objects affects how the control module interacts with at least one other data object of the plurality of data objects, and wherein the payload data of the data stream of at least one of the plurality of data objects is rewritable.

2. The system of claim 1, wherein the plurality of WORM metadata fields for each of the plurality of data objects occupies the same number of bytes.

3. The system of claim 1, wherein the data object type stored in the second WORM metadata field of the first data object causes the control module to replicate the at least one other data object.

4. The system of claim 3, wherein the plurality of metadata fields of the first data object further comprises a third WORM metadata field storing a data object class, wherein the control module is configured to replicate the at least one other data object according to copy permissions associated with the data object class of said first data object.

5. The system of claim 1, wherein the data object type stored in the second WORM metadata field of the first data object causes the control module to search the at least one other data object.

6. The system of claim 1, further comprising an application configured to execute on the computing device, and wherein the data object type stored in the second WORM metadata field of the first data object causes the control module to communicate with the application to interact with the at least one other data object.

7. A system for managing data, the system comprising:
a control module configured to execute on a computing device; and
a plurality of data objects each further comprising,
a data stream comprising rewritable payload data, and
a plurality of metadata fields having metadata specific to the payload data of the data stream and comprising a write-once-read-many (WORM) metadata field storing a data object type corresponding to the payload data of the data stream, wherein the data object type affects how the control module interacts with the data object,
wherein the control module is configured to manage access to each of the plurality of data objects,
and wherein the WORM metadata field for each of the plurality of data objects occupies the same number of bits.

8. The system of claim 7, wherein the WORM metadata field consists of sixteen bits.

9. The system of claim 7, further comprising a file system on the computing device, wherein the control module sits at the same layer as the file system.

10. The system of claim 9, further comprising a device driver on the computing device configured to access the plurality of data objects.

11. The system of claim 10, wherein the control module is configured to communicate directly, outside of the file system, with the device driver to manage access to each of the plurality of data objects.

12. The system of claim 11, wherein the control module is configured to copy at least one of the plurality of data objects from a first storage device to a second storage device.

13. The system of claim 10, wherein the file system is configured to communicate with the device driver to manage access to each of the plurality of data objects.

14. The system of claim 7, further comprising at least one application on the computing device and wherein the plurality of data objects comprises:
a first set of data objects all having the same data object type; and
a second set of data objects each having a different data object type than the first set of data objects,
wherein the payload data of the first set of data objects is accessible by the at least one application, and wherein the second set of data objects is not accessible by the at least one application.

15. A method for managing data, the method comprising:
receiving with a control module executing on a computing device a plurality of data streams of content, each of the plurality of data streams comprising payload data;
assigning read-only metadata for each of the plurality of data streams, the read-only metadata being specific to the payload data of each of the plurality of data streams, wherein said assigning further comprises generating for each of the plurality of data streams a data object type that affects how the control module interacts with the plurality of data streams; and
storing the read-only metadata in a plurality of metadata fields with each respective one of the plurality of data streams on a physical storage device to create a plurality of data elements,
wherein the plurality of metadata fields for each of the plurality of data elements occupies the same number of bytes, and
wherein the payload data of the data stream of at least one of the plurality of data elements is rewritable.

16. The method of claim 15, additionally comprising causing, based on the data object type stored in a first one of the plurality of data elements, the control module to interact with the data stream of the first one of the plurality of data elements.

17. The method of claim 15, additionally comprising causing, based on the data object type stored in a first one of the plurality of data elements, the control module to interact with the data stream of a second one of the plurality of data elements.

18. The method of claim 17, wherein said causing the control module to interact with the data stream of said second one of the plurality of data elements comprises automatically copying said second one of the plurality of data elements.

19. The method of claim 18, wherein said copying is performed according to a data object class stored in the read-only metadata.

20. The method of claim 17, wherein said causing the control module to interact with the data stream of said second one of the plurality of data elements comprises the control module communicating with an application to interact with the data stream of said second one of the plurality of data elements.

* * * * *